US009900668B2

(12) United States Patent
Cheatham, III et al.

(10) Patent No.: US 9,900,668 B2
(45) Date of Patent: *Feb. 20, 2018

(54) AD-HOC WIRELESS SENSOR PACKAGE

(71) Applicant: Elwha LLC, Bellevue, WA (US)

(72) Inventors: Jesse R. Cheatham, III, Seattle, WA (US); Matthew G. Dyor, Bellevue, WA (US); Peter N. Glaskowsky, Carnation, WA (US); Kimberly D. A. Hallman, Bellevue, WA (US); Roderick A. Hyde, Redmond, WA (US); Muriel Y. Ishikawa, Livermore, CA (US); Edward K. Y. Jung, Bellevue, WA (US); Michael F. Koenig, Bellevue, WA (US); Robert W. Lord, Seattle, WA (US); Richard T. Lord, Tacoma, WA (US); Craig J. Mundie, Seattle, WA (US); Nathan P. Myhrvold, Bellevue, WA (US); Robert C. Petroski, Seattle, WA (US); Desney S. Tan, Kirkland, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/727,109

(22) Filed: Dec. 26, 2012

(65) Prior Publication Data
US 2014/0176343 A1 Jun. 26, 2014

(51) Int. Cl.
G08C 19/20 (2006.01)
H04Q 9/00 (2006.01)

(52) U.S. Cl.
CPC ......... *H04Q 9/00* (2013.01); *H04Q 2209/886* (2013.01)

(58) Field of Classification Search
CPC .......... H02J 7/025; Y10T 307/25; H04Q 9/00; H04Q 2209/886
USPC .................................................. 340/870.03
See application file for complete search history.

(56) References Cited

U.S. PATENT DOCUMENTS

| 3,995,429 | A | 12/1976 | Peters |
| 5,319,153 | A | 6/1994 | Fishman |
| 6,123,093 | A | 9/2000 | D'Antonio et al. |
| 6,166,317 | A | 12/2000 | Volk, Jr. |
| 7,220,015 | B2 | 5/2007 | Dowling |

(Continued)

OTHER PUBLICATIONS

Cottone, Francesco; "Introduction to Vibration Energy Harvesting"; NiPS Energy Harvesting Summer School, ESIEE Paris; Paris, France; bearing a date of Aug. 2011; pp. 1-48.

(Continued)

*Primary Examiner* — Quang D Pham

(57) ABSTRACT

Systems, methods, computer-readable storage mediums including computer-readable instructions and/or circuitry for control of transmission to a target device with communicating with one or more sensors in an ad-hoc sensor network may implement operations including, but not limited to: obtaining location data associated with a portion of a region including at least one sensor; wirelessly transmitting one or more sensor operation activation signals to one or more sensors; and powering one or more sensing operations of a sensor via the one or more sensor operation activation signals.

32 Claims, 20 Drawing Sheets

(56) References Cited

U.S. PATENT DOCUMENTS

| | | | |
|---|---|---|---|
| 8,099,130 B1* | 1/2012 | Halla et al. | 455/561 |
| 8,531,288 B1* | 9/2013 | Khan | H04W 4/02 340/10.1 |
| 8,638,253 B1* | 1/2014 | Dryer | 342/28 |
| 8,674,804 B2 | 3/2014 | Miller et al. | |
| 8,947,230 B1* | 2/2015 | Gettings et al. | 340/540 |
| 2003/0025603 A1* | 2/2003 | Smith | G06F 21/35 340/572.8 |
| 2004/0090195 A1 | 5/2004 | Motsenbocker | |
| 2005/0080601 A1* | 4/2005 | Wren | G05B 15/02 703/2 |
| 2005/0143133 A1* | 6/2005 | Bridgelall | H01Q 1/007 455/562.1 |
| 2006/0064196 A1* | 3/2006 | Inkpen et al. | 700/142 |
| 2006/0191185 A1 | 8/2006 | Hansen | |
| 2006/0238309 A1* | 10/2006 | Takatama | G06K 19/0723 340/10.41 |
| 2007/0040687 A1* | 2/2007 | Reynolds | G01S 13/74 340/572.7 |
| 2007/0052692 A1 | 3/2007 | Gruhlke et al. | |
| 2007/0139183 A1* | 6/2007 | Kates | G08B 25/005 340/521 |
| 2008/0148059 A1 | 6/2008 | Shapiro | |
| 2008/0186173 A1 | 8/2008 | Gates | |
| 2009/0010197 A1* | 1/2009 | Chao | H04H 20/61 370/312 |
| 2009/0030551 A1 | 1/2009 | Hein et al. | |
| 2009/0085718 A1* | 4/2009 | Hamel | A61B 17/00 340/5.5 |
| 2010/0125437 A1* | 5/2010 | Vasseur | H04L 43/10 702/188 |
| 2010/0161630 A1* | 6/2010 | Moriwaki | H04L 67/12 707/758 |
| 2010/0223659 A1 | 9/2010 | Ekl et al. | |
| 2010/0243633 A1 | 9/2010 | Huynh et al. | |
| 2010/0308990 A1* | 12/2010 | Simon et al. | 340/506 |
| 2011/0263950 A1 | 10/2011 | Larson et al. | |
| 2012/0065930 A1* | 3/2012 | Allee et al. | 702/150 |
| 2012/0139750 A1* | 6/2012 | Hayakawa | H04Q 9/00 340/870.03 |
| 2012/0173050 A1 | 7/2012 | Bernstein et al. | |
| 2012/0176239 A1* | 7/2012 | Preden et al. | 340/539.17 |
| 2012/0300067 A1* | 11/2012 | Naqvi | G01V 3/12 348/143 |
| 2013/0085688 A1* | 4/2013 | Miller | G01F 1/66 702/48 |
| 2013/0099922 A1* | 4/2013 | Lohbihler | G08B 13/184 340/539.17 |
| 2013/0140016 A1 | 6/2013 | Storm et al. | |
| 2013/0307703 A1 | 11/2013 | Foucher et al. | |
| 2014/0077944 A1* | 3/2014 | Baskin | H04Q 9/00 340/539.1 |
| 2014/0145025 A1 | 5/2014 | Fang et al. | |
| 2014/0347193 A1* | 11/2014 | Ljung | H04L 67/04 340/870.01 |

OTHER PUBLICATIONS

Sonkusale, Sameer R. et al.; "A Wireless Data and Power Telemetry System Using Novel BPSK Demodulator for Non-Destructive Evaluation of Structures"; IEEE Sensors 2007 Conference; created on Apr. 11, 2017; pp. 300-303.

Young, William F. et al.; "Optimizing Arrays of Randomly Placed Wireless Transmitters for Receivers Located Within the Array Volume"; IEEE Transactions on Antennas and Propagation; Mar. 2007; pp. 698-706; vol. 55, No. 3.

Chevalerias, Olivier et al.; "Inductive Telemetry of Multiple Sensor Modules"; Pervasive Computing; Jan.-Mar. 2005; pp. 46-52; IEEE CS and IEEE ComSoc.

Cotterell, Susan et al.; "Applications and Experiments with eBlocks—Electronic Blocks for Basic Sensor-Based Systems"; IEEE; 2004; created on Apr. 11, 2017; pp. 7-15.

* cited by examiner

```
                                                                    400
                                                                 ┌─
                                                                 ▼

┌─────────────────────────────────────────────────────────────────────────┐
│ 1702 transmitting one or more signals indicative of a presence of a sensor │
│ within the portion of the region to be monitored to a sensor monitoring  │
│ device                                                                   │
│  ┌──────────────────┐  ┌──────────────────┐  ┌──────────────────┐       │
│  │ 1704 transmitting│  │ 1706 transmitting│  │ 1708 transmitting│       │
│  │ one or more signals│ │ one or more signals│ │ one or more signals│   │
│  │ indicative of a  │  │ indicative of a  │  │ indicative of a  │       │
│  │ presence of a sensor│ │ presence of a sensor│ │ presence of a sensor│ │
│  │ via a passive radio│ │ via a retro-reflector of│ │ via a micro-   │  │
│  │ frequency        │  │ the sensor       │  │ electromechanical│       │
│  │ identification chip of│ │              │  │ device of the sensor│    │
│  │ the sensor       │  │                  │  │                  │       │
│  └──────────────────┘  └──────────────────┘  └──────────────────┘       │
└─────────────────────────────────────────────────────────────────────────┘
                                    │
┌─────────────────────────────────────────────────────────────────────────┐
│ 402 obtaining location data associated with the portion of the region to be │
│ monitored                                                                │
└─────────────────────────────────────────────────────────────────────────┘
                                    │
┌─────────────────────────────────────────────────────────────────────────┐
│ 404 wirelessly transmitting one or more sensor operation activation signals │
│ to one or more sensors according to the location data                    │
└─────────────────────────────────────────────────────────────────────────┘
                                    │
┌─────────────────────────────────────────────────────────────────────────┐
│ 406 powering one or more sensing operations of a sensor via the one or   │
│ more sensor operation activation signals                                 │
└─────────────────────────────────────────────────────────────────────────┘
```

FIG. 17

AD-HOC WIRELESS SENSOR PACKAGE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

Priority Applications

None.

Related Applications

U.S. patent application Ser. No. 13/727,102, entitled AD-HOC WIRELESS SENSOR PACKAGE, naming JESSE R. CHEATHAM, III, MATTHEW G. DYOR, PETER N. GLASKOWSKY, KIMBERLY D. A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012 , is related to the present application.

U.S. patent application Ser. No. 13/727,117, entitled AD-HOC WIRELESS SENSOR PACKAGE, naming JESSE R. CHEATHAM, III, MATTHEW G. DYOR, PETER N. GLASKOWSKY, KIMBERLY D. A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012 , is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

Systems, methods, computer-readable storage mediums including computer-readable instructions and/or circuitry for control of transmission to a target device with communicating with one or more sensors in an ad-hoc sensor network may implement operations including, but not limited to: obtaining location data associated with a portion of a region including at least one sensor; wirelessly transmitting one or more sensor operation activation signals to one or more sensors; and powering one or more sensing operations of a sensor via the one or more sensor operation activation signals.

The foregoing summary is illustrative only and is not intended to be in any way limiting. In addition to the illustrative aspects, embodiments, and features described above, further aspects, embodiments, and features will become apparent by reference.

BRIEF DESCRIPTION OF THE FIGURES

FIGS. 3-20 show operations for communicating with one or more sensors in an ad-hoc sensor network.

DETAILED DESCRIPTION

Figure 1:
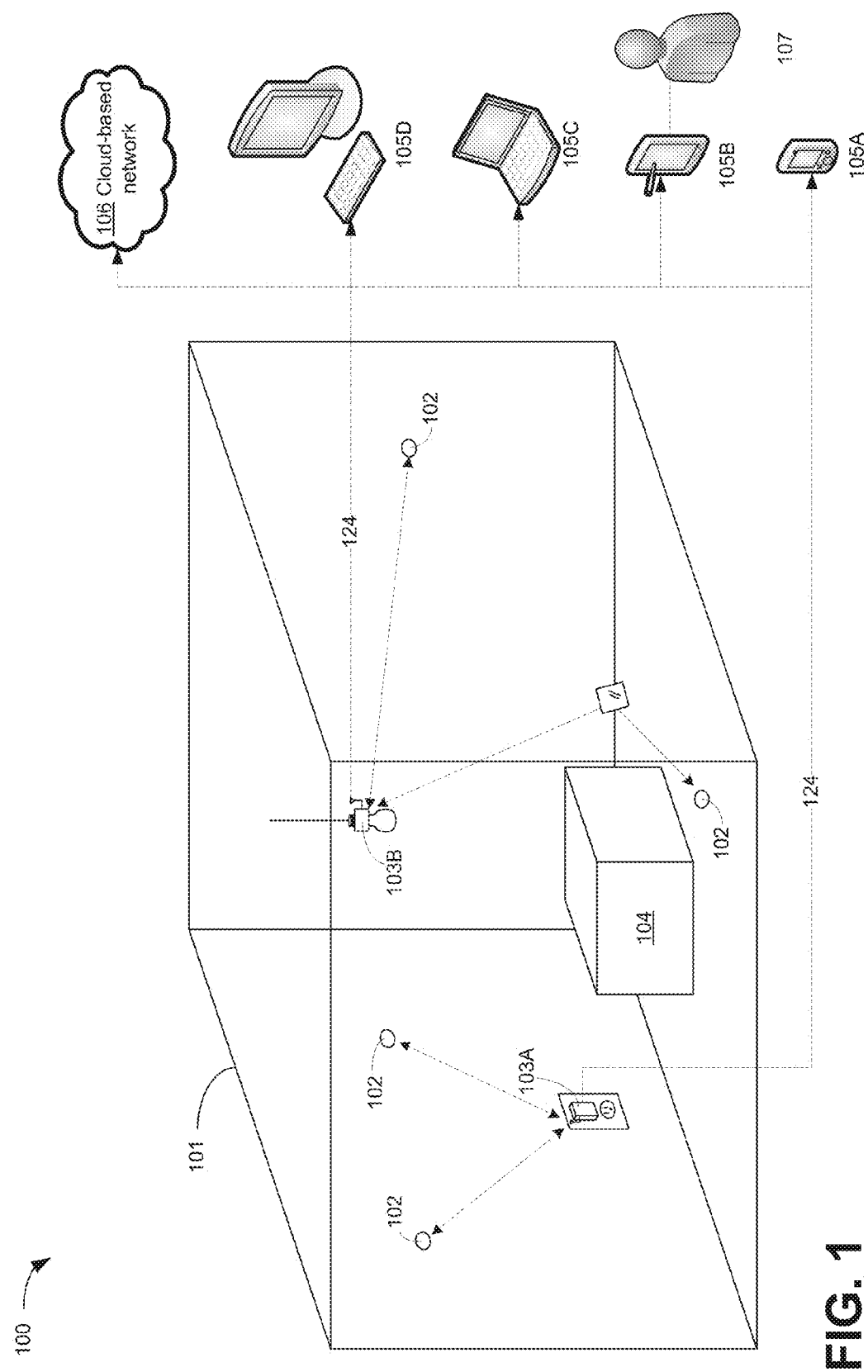
FIG. 1 shows a high-level block diagram of an operational environment communicating with one or more sensors in an ad-hoc sensor network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an ad hoc sensor system 100 disposed about a region 101. The ad hoc sensor system 100 may include one or more sensors 102 and one or more sensor monitoring devices 103. The sensors 102 may be simple single or limited-purpose sensors configured for monitoring one or more characteristics of an environment. For example, the sensors 102 may be thermal sensors, pressure sensors, motion sensors, image capture sensors, audio sensors, electromagnetic sensors, and the like, configured for monitoring of the region 101 and/or one or more items 104 (e.g. machines, people, products, and the like) located within the region 101. The sensors may be affixed to any surface within the region 101 via various means. In one embodiment, the sensors 102 may include an adhesive composition capable of adhering to a surface within the region 101. More specifically, the adhesive composition may be a moisture-activated adhesive such that a user may apply a liquid (e.g. water or saliva) to the adhesive composition thereby activating the adhesive and allowing for disposal of the sensor 102 on a surface.

A sensor monitoring device 103 may serve to provide a communications link between the sensors 102 and one or more processing devices 105 (e.g. a cell phone 105A, a tablet computer 105B, a laptop computer 105C, a desktop computer 105D, and the like and/or a cloud-based network 106 running an application accessible by such devices) which may receive data from the sensors 102 and provide that data to a user 107 monitoring the region 101 and/or the items 104. The sensor monitoring devices 103 may be pluggable (e.g. configured to be received within or to receive) with respect to one or more standard environmental devices (e.g. a standard 110-volt wall outlet-pluggable sensor monitoring device 103A, a standard 60-watt light socket-pluggable sensor monitoring device 103B, and the like) such that the region 101 may be easily retrofitted to employ the ad hoc sensor system 100 by incorporating the sensor monitoring devices 103 into pre-existing power supplies.

Figure 2:
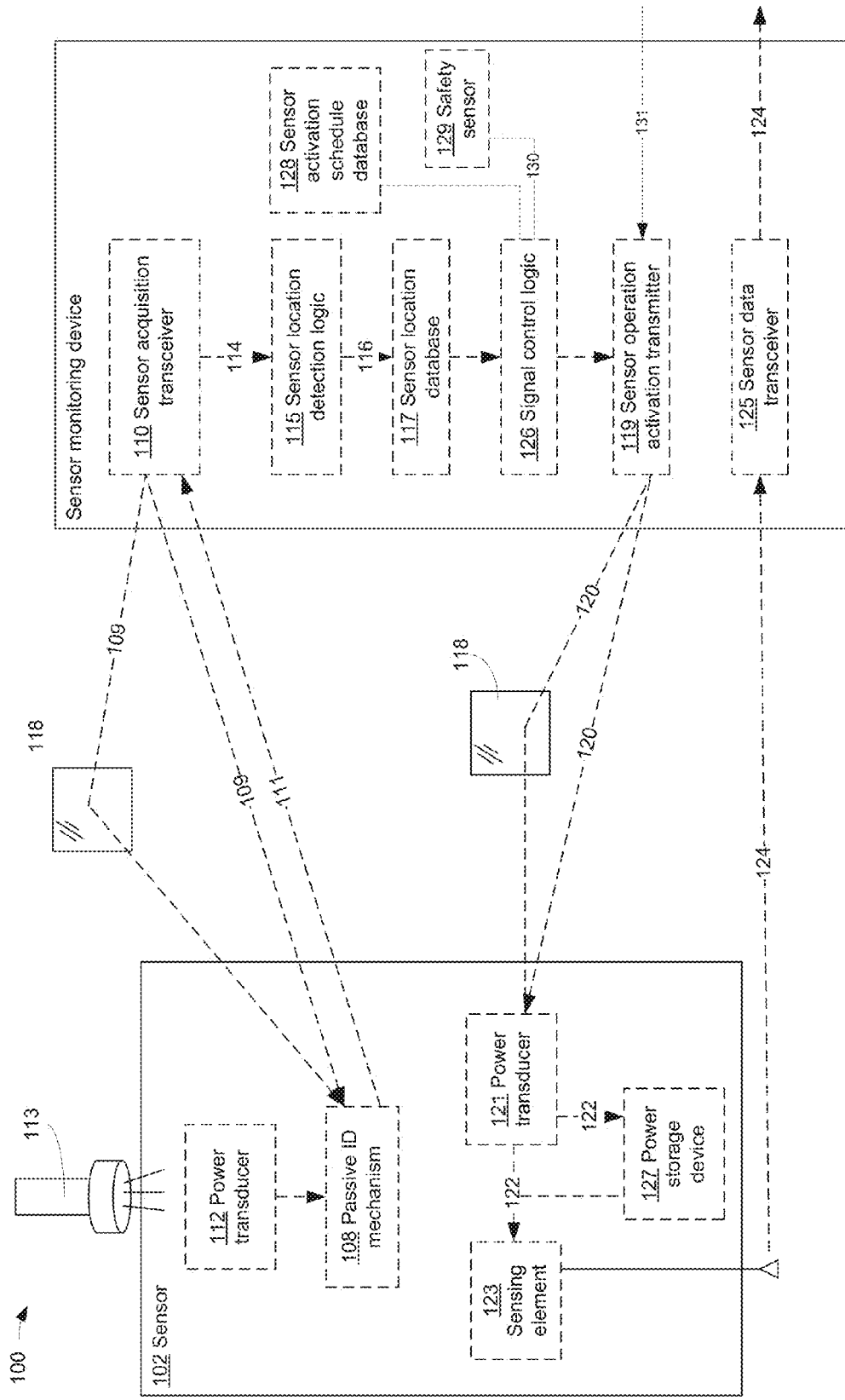
FIG. 2 shows a high-level block diagram of a system for communicating with one or more sensors in an ad-hoc sensor network.

Referring to FIG. 2, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensor 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

The identification signal 111 may simply be a beacon-type signal that simply indicates the presence of a sensor 102 within the currently scanned region (e.g. where the passive identification mechanism 108 is merely a reflective surface on the sensor 102). Alternately the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

In another embodiment, the passive identification mechanism 108 may provide the identification signal 111 independent of any interaction with the sensor monitoring device 103. For example, the sensor 102 may include a transducer 112 responsive to an independent signal source 113 (e.g. a flashlight, handheld UV light, and the like). The transducer 112 may convert a signal (e.g. light) from the independent signal source 113 into power sufficient to power the passive identification mechanism 108 to generate the identification signal 111 for transmission to the sensor monitoring device 103. As such, a user tasked with affixing one or more sensors 102 about the region 101 may, at the same time, temporarily activate the passive identification mechanism 108 via the independent signal source 113 to allow for initial acquisition of the sensor 102 by the sensor monitoring device 103. It may be the case that the sensor monitoring device 103 is continually monitoring the region 101 and may detect the presence of the sensor 102 within the temporary activation of the passive identification mechanism 108 via the independent signal source 113.

The sensor monitoring device 103 may scan the region 101 in a zonal manner whereby the sensor acquisition transceiver 110 is progressively directed to various portions of the region 101 and transmits the sensor acquisition signal 109. Upon detection of a presence of a sensor 102 within a portion of the region 101 currently subject to scanning through receipt of the identification signal 111, the sensor acquisition transceiver 110 may provide a signal 114 to sensor location detection logic 115 of the sensor monitoring device 103. The sensor location detection logic 115 may, in turn, correlate the portion of the region 101 currently subject to scanning (e.g. via data associated with a current orientation of one or more control actuators and/or a directional antenna associated with the sensor acquisition transceiver 110) with a detected sensor 102 and store sensor location data 116 associated with that portion of the region 101 to a sensor location database 117. In one embodiment, the sensor acquisition transceiver 110 may scan along a first axis (e.g. an x-axis) and then scan along a second axis (e.g. a y-axis).

Further, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

In an alternate embodiment, the ad hoc sensor system 100 may include at least one mobile robotic device configured to traverse the region 101 (e.g. a repurposed robotic device such as a Roomba® product manufactured by iRobot of Bedford, Mass. The mobile robotic device may include sensor monitoring device 103 and/or a reflective surface 118 which may be targeted by another sensor monitoring device 103. The mobile robotic device may traverse the region 101 and conduct acquisition and or activation operations with respect to the sensors 102 as described above.

The sensors 102 may be configured as passive sensors with no on-board power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations. Following sensing operations by the sensing element 123, sensor data 124 may be transmitted to a sensor data transceiver 125 of the sensor monitoring device 103 which, in turn may transmit the sensor data 124 on to the processing devices 105 for further data analysis and review by a user.

In an exemplary embodiment, the sensor operation activation transmitter 119 may include one or more laser transmitters configured to transmit the sensor operation activation signal 120 to one or more sensors 102. Due to regulatory and/or safety issues, it may be the case that the sensor operation activation transmitter 119 may further include one or more lens elements configured to at least partially defocus the laser-based sensor operation activation signal 120 emitted by the sensor operation activation transmitter 119. A defocused laser-based sensor operation activation signal 120 may include beam components having varying focal length components. Further, the sensor operation activation transmitter 119 may be configured to produce a laser-based sensor operation activation signal 120 of moderate to high divergence such that the power density of the laser-based sensor operation activation signal 120 dissipates over a relatively short distance.

Figure 3:
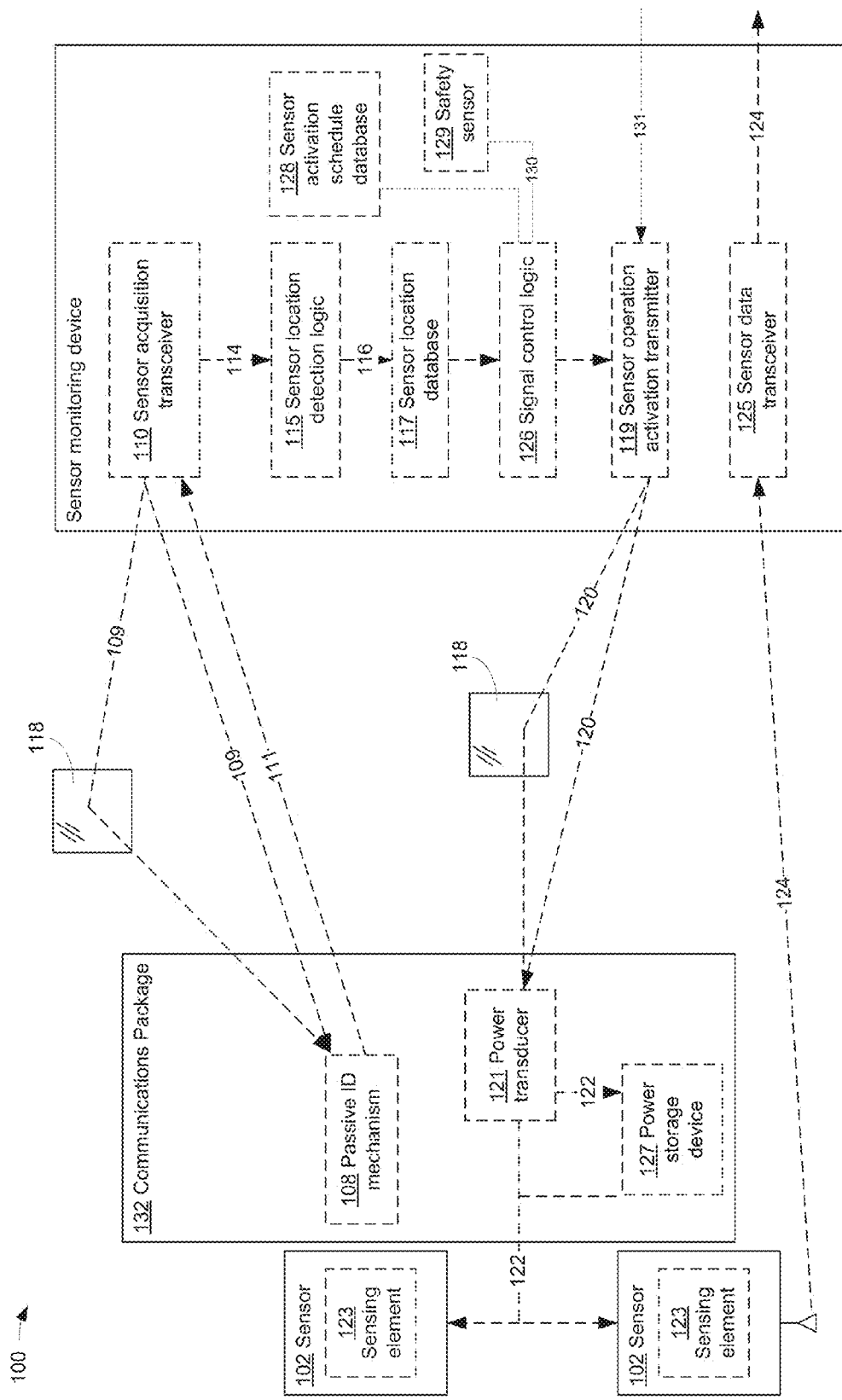

In another exemplary embodiment, as shown in FIG. 3, a sensor 102 may include the sensing element 123 but may be independent of a communications package 132 including the passive identification mechanism 108 and/or the power transducer 121. In this manner, the communications package 132 may be operably coupled (e.g. via a Universal Serial Bus-type connection) to and provide power 122 to multiple sensors 102. Such a configuration may allow for connection of several limited-purpose sensors 102 configured for divergent sensing operations (e.g. a thermal sensor and a video capture sensor) into a single sensor package with a common communications package 132 configured for receiving power via a common sensor operation activation signal 120.

In an exemplary embodiment, signal control logic 126 of the sensor monitoring devices 103 may obtain sensor location data 116 from previous sensor acquisitions. The signal control logic 126 may query the sensor location database 117 for the location of at least one sensor 102 and provide control signals to the sensor acquisition transceiver 110 to direct the sensor operation activation signal 120 in the direction of the at least one sensor 102 (e.g. via configuring one or more actuators or a directional antenna array). The signal control logic 126 may cycle through the detected inventory of sensors 102 and configure the sensor operation activation transmitter 119 to transmit the sensor operation activation signal 120 in the direction of a given sensor 102 during a given time interval associated with that sensor 102 before moving on to transmissions to additional sensors 102. It may be the case that the sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to cache sensor data over a period of days or weeks. As such, a sensor 102 may include a power storage device 127 (e.g. a capacitor, a battery, and the like) chargeable by the power 122 generated by the power transducer 121 in response to the sensor operation activation signal 120. The power stored by the power storage device 127 may be surplus power provided during irradiation of the power transducer 121 by the sensor operation activation transmitter 119 that is not required for sensing operations of the sensing element 123 during that time period. The power stored by the power storage device 127 may then be used for sensing operations of the sensing element 123 during time periods where the sensor operation activation transmitter 119 is not currently irradiating the power transducer 121. Power-intensive sensor operations such as cached sensor data transmission from the sensor 102 to the sensor monitoring device 103 may only occur intermittently when the additional power provided by the sensor operation activation signal 120 is provided to the sensor 102.

In another exemplary embodiment, the ongoing sensor operations of a sensor 102 may have power requirements such that ongoing transmission of the sensor operation activation signal 120 is required. For example, for real-time audio or video sensing, the sensor operation activation signal 120 may be transmitted in a continuous manner to one or more sensors 102.

In another exemplary embodiment, the transmission of the sensor operation activation signal 120 to a sensor 102 by the sensor operation activation transmitter 119 may be conducted according to a schedule. For example, it may be the case that the sensor operation activation signal 120 may be a high-power signal (e.g. a high-power optical, ultraviolet, or x-ray beam). It may be undesirable to transmit the sensor operation activation signal 120 having such high-power characteristics into a region 101 containing sensitive items 104 and or personnel. As such, the sensor monitoring devices 103 may include a sensor activation schedule database 128. The sensor activation schedule database 128 may include scheduling data associated with authorized time periods when a high-power sensor operation activation signal 120 may be provided to the sensor 102 to initiate and/or power various sensor operations. For example, it may be desirable to activate the high-power sensor operation activation signal 120 at a time when personnel will generally be absent from the region 101 or when certain sensitive items 104 (e.g. biological matter, volatile chemical compositions) are not scheduled to be within the region 101 (e.g. during the night when a facility including the region 101 is closed). The signal control logic 126 may query the sensor activation schedule database 128 to retrieve scheduling data from the sensor activation schedule database 128 and activate the sensor operation activation transmitter 119 according to that schedule.

Further, in another exemplary embodiment, the sensor operation activation transmitter 119 may be controlled by an external control signal 129. The external control signal 129 may be provided to the sensor monitoring device 103 by the one or more processing devices 105 (e.g. a cell phone, tablet computer, laptop computer, and the like) external to the at the sensor monitoring device 103 at the direction of a user 107. Alternately, as described above, the sensor monitoring devices 103 may be pluggable with respect to one or more standard environmental devices (e.g. a standard 110-volt wall outlet-pluggable sensor monitoring device 103A, a standard 60-watt light socket-pluggable sensor monitoring device 103B, and the like). It may be the case that a wall outlet and/or light socket may be controllable by a switch (e.g. a standard wall-mounted light switch) as would be the case for a standard appliance or light bulb coupled to the wall outlet and/or light socket. The sensor monitoring devices 103 may be likewise be configured such that the same switch may control the sensor monitoring devices 103 to power on the sensor operation activation transmitter 119 when the switch is actuated by a user.

Further, in another exemplary embodiment, one or more safety features may be employed by the ad hoc sensor system 100 in an attempt to ensure that a high-power sensor operation activation signal 120 is not activated when the personnel or certain sensitive items 104 (e.g. biological matter, volatile chemical compositions) are within the region 101. For example, a sensor monitoring device 103 may further include at least one safety sensor 130. The safety sensor 130 may serve to determine if one on more specified objects (e.g. personnel, biological matter, volatile chemical compositions, and the like) are present within the region 101. In the case where the safety sensor 130 detects the presence of a specified object, the safety sensor 130 may provide a notification signal 131 to the signal control logic 126. In response to the notification signal 131, the signal control logic 126 may restrict an otherwise scheduled transmission of the high-power sensor operation activation signal 120 into the region 101. The safety sensor 130 may include one or more of a motion sensor (e.g. detecting movement of a person within the region 101), an image capture sensor operably coupled to image recognition logic (e.g. detecting an image of a person or object within the region 101), an RF sensor (e.g. detecting an RFID chip associated with an identification badge of a person or object within the region 101), and the like.

In another exemplary embodiment, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

In another exemplary embodiment, a sensing element 123 may include at least one passive (e.g. operating only in response to an environmental stimulus) sensing element. For example, the sensing element 123 may include a MEMS device which may be responsive to environmental conditions such as temperature, pressure, humidity, and the like. Upon irradiation of the sensor 102 by a sensor operation activation signal 120 wirelessly transmitted by the sensor operation activation transmitter 119 (e.g. optical/laser transceiver, and the like) of the sensor monitoring device 103, may receive the sensor operation activation signal 120, modulate that sensor operation activation signal 120 according to the environmental conditions and retransmit the modulated sensor operation activation signal 120 as the sensor data 124.

Figure 4:
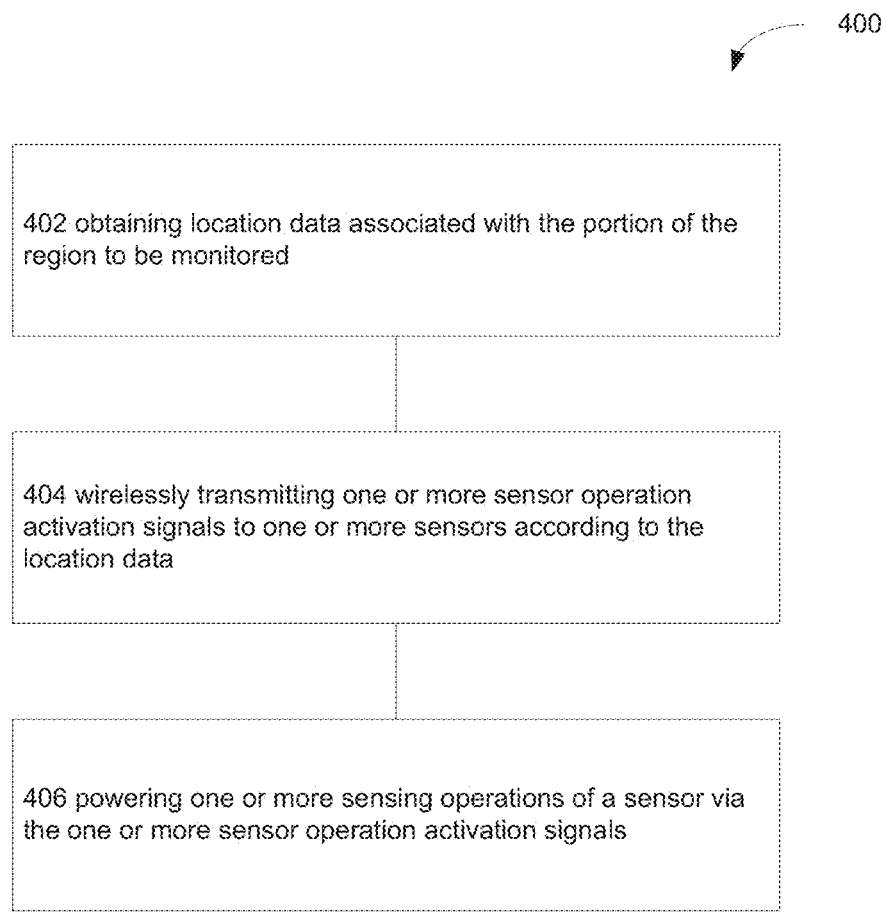

FIG. 4 and the following figures include various examples of operational flows, discussions and explanations may be provided with respect to the above-described exemplary environment of FIGS. 1-3. However, it should be understood that the operational flows may be executed in a number of other environments and contexts, and/or in modified versions of FIGS. 1-3. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 4 illustrates an operational procedure 400 for practicing aspects of the present disclosure including operations 402, 404 and 406.

Operation 402 illustrates obtaining location data associated with a portion of a region including at least one sensor. For example, as shown in FIGS. 1-2, upon receipt of an identification signal 111 indicative of a presence of a sensor 102 within a portion of the region 101 currently subject to scanning, the sensor acquisition transceiver 110 may provide a signal 114 to sensor location detection logic 132 of the sensor monitoring device 103. The sensor location detection logic 115 may, in turn, correlate the portion of the region 101 currently subject to scanning (e.g. via data associated with a current orientation of one or more control actuators and/or a directional antenna array associated with the sensor acquisition transceiver 110) with a detected sensor 102 and store sensor location data 116 associated with that portion of the region 101 to a sensor location database 117 (e.g. in a look-up table). When a transmission of a sensor operation activation signal 120 is scheduled/requested, the signal control logic 126 may query the sensor location database 117 for the location of at least one sensor 102 and provide control signals to the sensor acquisition transceiver 110 to direct the sensor operation activation signal 120 in the direction of the at least one sensor 102 (e.g. via configuring one or more actuators or a directional antenna array).

Operation 404 illustrates wirelessly transmitting one or more sensor operation activation signals to one or more sensors according to the location data. For example, as shown in FIGS. 1-2, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The signal control logic 126 may direct the sensor acquisition transceiver 110 in the direction of the at least one sensor 102 (e.g. via configuring one or more actuators or a directional antennal array) according to location of at least one sensor 102 obtained from the sensor location database 117 and transmit the sensor operation activation signal 120.

Operation 406 illustrates powering one or more sensing operations of a sensor via the one or more sensor operation activation signals. For example, as shown in FIGS. 1-3, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

Figure 5:
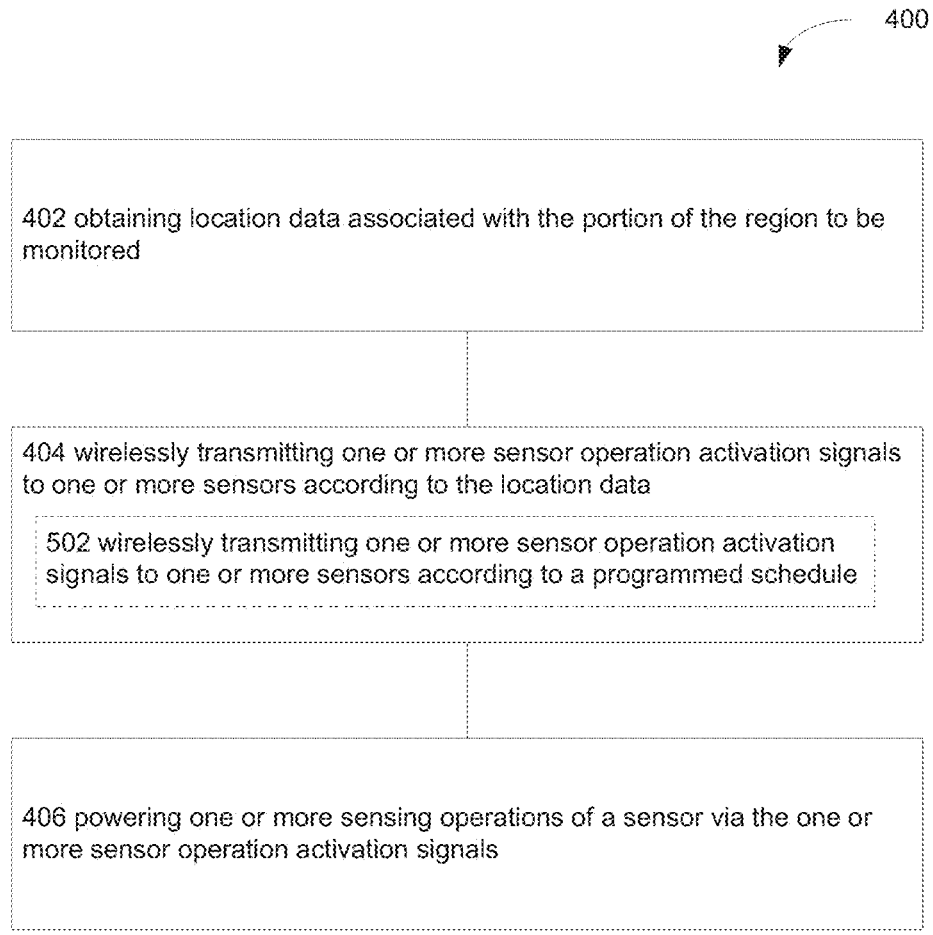

FIG. 5 further illustrates an operational procedure wherein operation 404 of operational flow 400 of FIG. 4 may include one or more additional operations. Additional operations may include operation 502.

Operation 502 illustrates wirelessly transmitting one or more sensor operation activation signals to one or more sensors according to a programmed schedule. For example, as shown in FIGS. 1-3, the transmission of the sensor operation activation signal 120 to a sensor 102 by the sensor operation activation transmitter 119 may be conducted according to a schedule. For example, it may be the case that the sensor operation activation signal 120 may be a high-power signal (e.g. a high-power optical, ultraviolet, or x-ray beam). It may be undesirable to transmit the sensor operation activation signal 120 having such high-power characteristics into a region 101 containing sensitive items 104 and or personnel. As such, the sensor monitoring devices 103 may include a sensor activation schedule database 128. The sensor activation schedule database 128 may include scheduling data associated with authorized time periods when a high-power sensor operation activation signal 120 may be provided to the sensor 102 to initiate and/or power various sensor operations. For example, it may be desirable to activate the high-power sensor operation activation signal 120 at a time when personnel will generally be absent from the region 101 or when certain sensitive items 104 (e.g. biological matter, volatile chemical compositions) are not scheduled to be within the region 101 (e.g. during the night when a facility including the region 101 is closed). The signal control logic 126 may query the sensor activation schedule database 128 to retrieve scheduling data from the sensor activation schedule database 128 and activate the sensor operation activation transmitter 119 according to that schedule.

Figure 6:
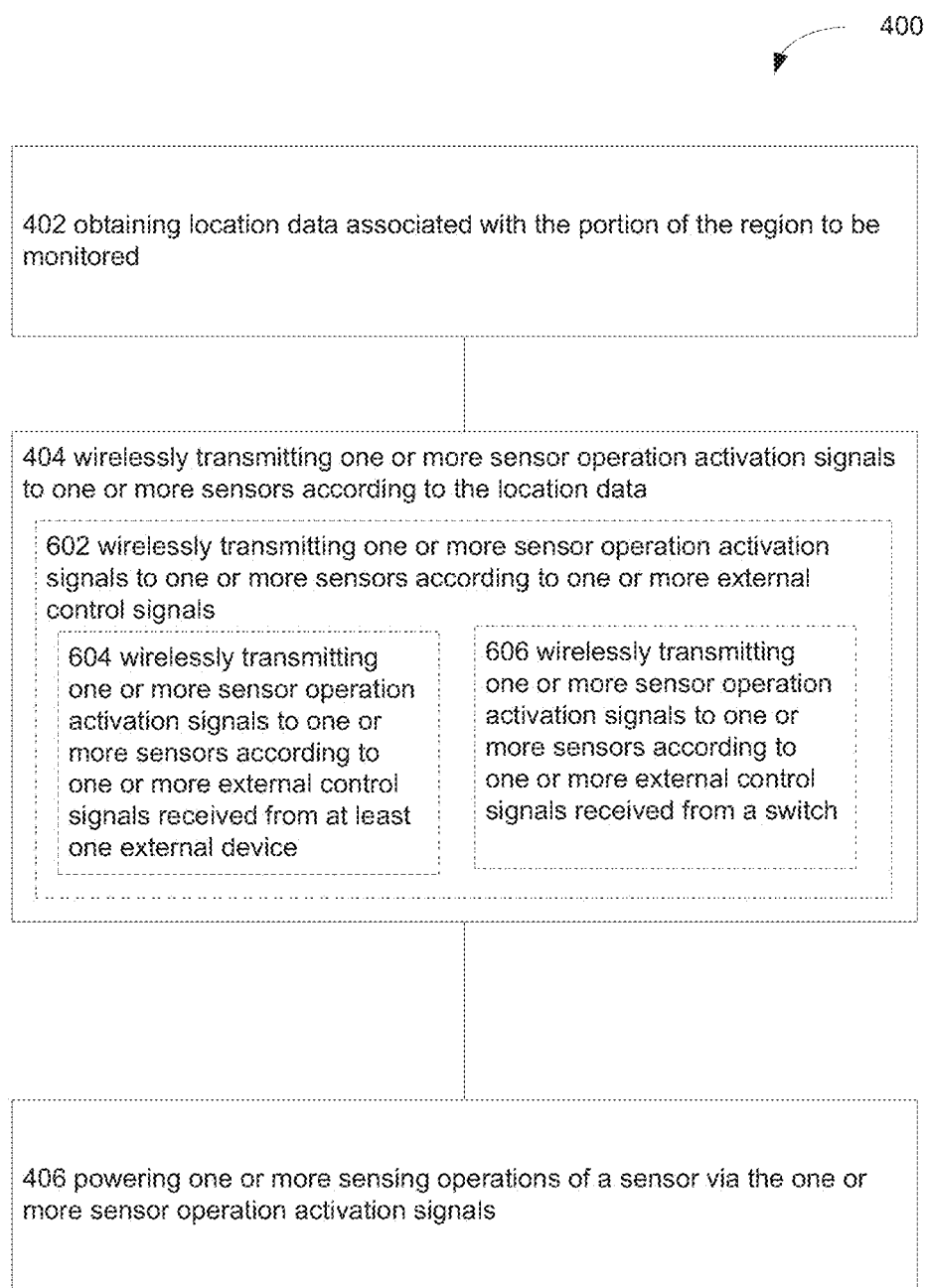

FIG. 6 further illustrates an operational procedure wherein operation 404 of operational flow 400 of FIG. 4 may include one or more additional operations. Additional operations may include operations 602, 604 and/or 606.

Operation 602 illustrates wirelessly transmitting one or more sensor operation activation signals to one or more sensors according to one or more external control signals. For example, as shown in FIGS. 1-3, the sensor operation activation transmitter 119 may be controlled by an external control signal 129 (e.g. a signal not originating from the sensor monitoring device 103).

Operation 604 illustrates wirelessly transmitting one or more sensor operation activation signals to one or more sensors according to one or more external control signals received from at least one external device. For example, as shown in FIGS. 1-3, an external control signal 129 may be provided to the sensor monitoring device 103 by one or more processing devices 105 (e.g. a cell phone, tablet computer, laptop computer, and the like) external to the at the sensor monitoring device 103 at the direction of a user 107.

Operation 606 illustrates wirelessly transmitting one or more sensor operation activation signals to one or more sensors according to one or more external control signals received from one or more switches. For example, as shown in FIGS. 1-3, the sensor monitoring devices 103 may be pluggable with respect to one or more standard environmental devices (e.g. a standard 110-volt wall outlet-pluggable sensor monitoring device 103A, a standard 60-watt light socket-pluggable sensor monitoring device 103B, and the like). It may be the case that a wall outlet and/or light socket may be controllable by a switch (e.g. a standard wall-mounted light switch) as would be the case for a standard appliance or light bulb coupled to the wall outlet and/or light socket. The sensor monitoring devices 103 may be likewise be configured such that the same switch may control the sensor monitoring devices 103 to power on the sensor operation activation transmitter 119 when the switch is actuated by a user.

Figure 7:
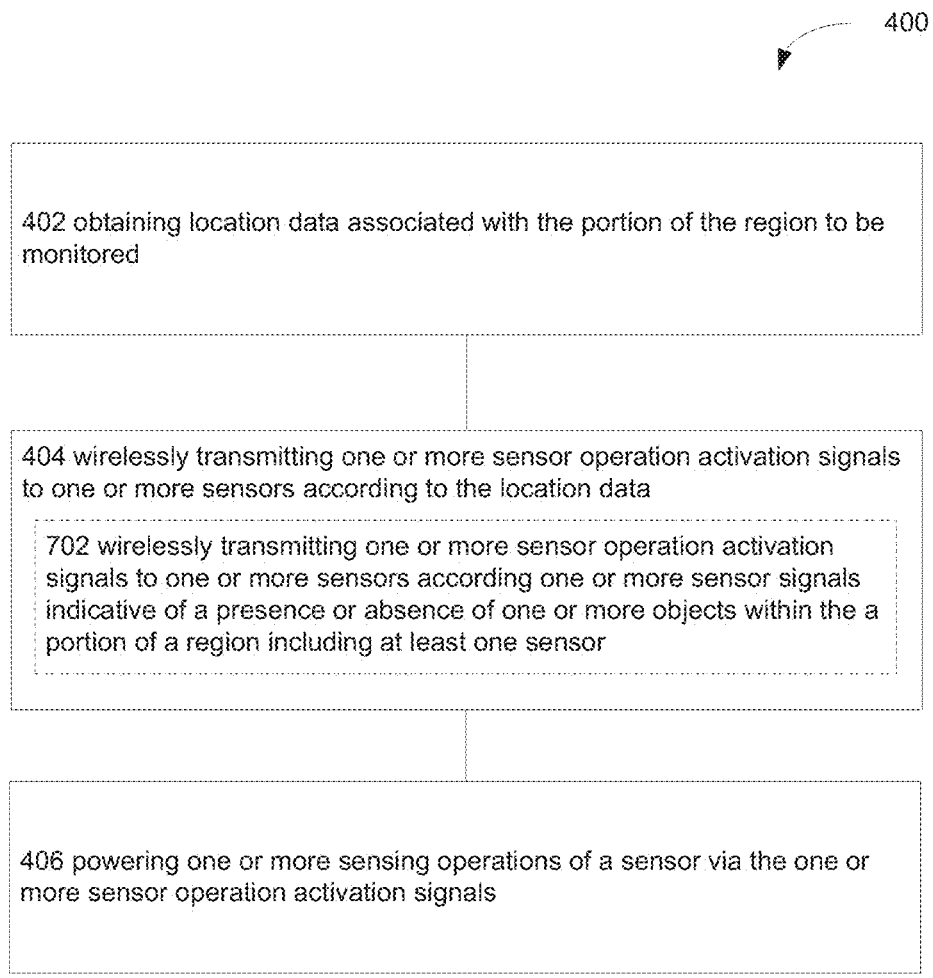

FIG. 7 further illustrates an operational procedure wherein operation 404 of operational flow 400 of FIG. 4 may include one or more additional operations. Additional operations may include operation 702.

Operation 702 illustrates wirelessly transmitting one or more sensor operation activation signals to one or more sensors according one or more sensor signals indicative of a presence or absence of one or more objects within the portion of a region including at least one sensor. For example, as shown in FIGS. 1-3, one or more safety features may be employed by the ad hoc sensor system 100 in an attempt to ensure that a high-power sensor operation activation signal 120 is not activated when the personnel or certain sensitive items 104 (e.g. biological matter, volatile chemical compositions) are within the region 101. For example, a sensor monitoring device 103 may further include at least one safety sensor 133. The safety sensor 130 may serve to determine if one on more specified objects (e.g. personnel, biological matter, volatile chemical compositions, and the like) are present within the region 101. In the case where the safety sensor 130 detects the presence of a specified object, the safety sensor 130 may provide a notification signal 134 to the signal control logic 126. In response to the notification signal 131, the signal control logic 126 may restrict an otherwise scheduled transmission of the high-power sensor operation activation signal 120 into the region 101. The safety sensor 130 may include one or more of a motion sensor (e.g. detecting movement of a person within the region 101), an image capture sensor operably coupled to image recognition logic (e.g. detecting an image of a person or object within the region 101), an RF sensor (e.g. detecting an RFID chip associated with an identification badge of a person or object within the region 101), and the like.

Figure 8:
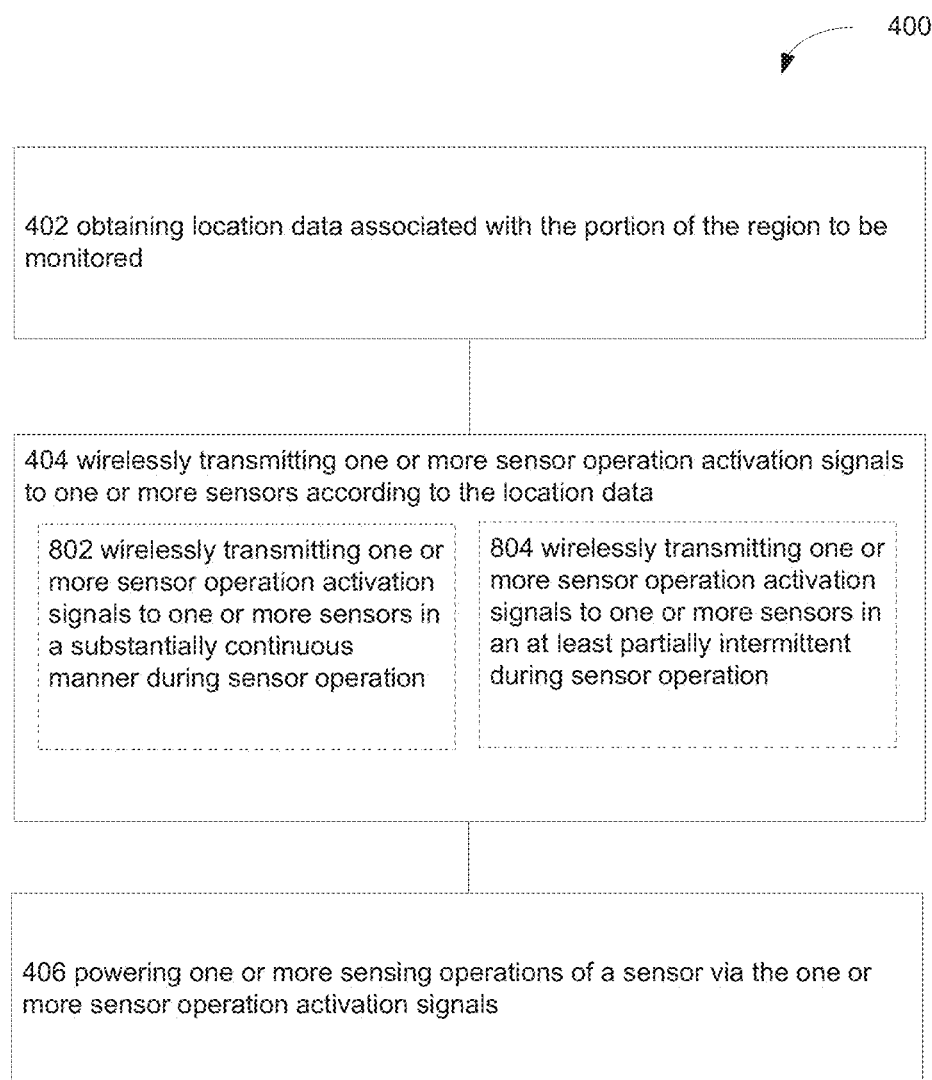

FIG. 8 further illustrates an operational procedure wherein operation 404 of operational flow 400 of FIG. 4 may include one or more additional operations. Additional operations may include operations 802 and/or 804.

Operation 802 illustrates wirelessly transmitting one or more sensor operation activation signals to one or more sensors in a substantially continuous manner during sensor operation. For example, as shown in FIGS. 1-3, power-intensive sensor operations such as cached sensor data transmission from the sensor 102 to the sensor monitoring device 103 may only occur intermittently when the additional power provided by the sensor operation activation signal 120 is provided to the sensor 102.

Operation 804 illustrates wirelessly transmitting one or more sensor operation activation signals to one or more sensors in an at least partially intermittent during sensor operation. For example, as shown in FIGS. 1-3, the ongoing sensor operations of a sensor 102 may have power requirements such that ongoing transmission of the sensor operation activation signal 120 is required. For example, for real-time audio or video sensing, the sensor operation activation signal 120 may be transmitted in a continuous manner to one or more sensors 102.

Figure 9:
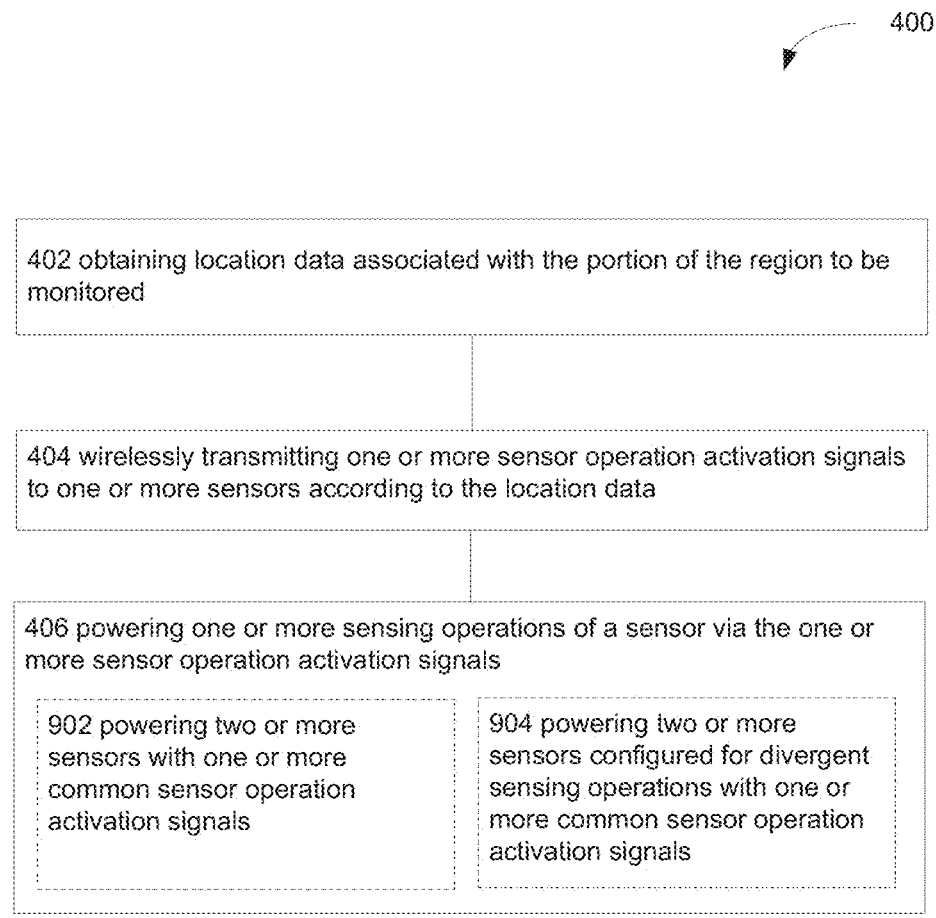

FIG. 9 further illustrates an operational procedure wherein operation 406 of operational flow 400 of FIG. 4 may include one or more additional operations. Additional operations may include operations 902 and/or 904.

Operation 902 illustrates powering two or more sensors with one or more common sensor operation activation signals. For example, as shown in FIG. 3, a sensor 102 may include the sensing element 123 but may be independent of a communications package 132 including the passive identification mechanism 108 and/or the power transducer 121. In this manner, the communications package 132 may be operably coupled (e.g. via a Universal Serial Bus-type connection) to and provide power 122 to multiple sensors 102.

Operation 904 illustrates powering two or more sensors configured for divergent sensing operations with one or more common sensor operation activation signals. For example, as shown in FIG. 3, a sensor 102 may include the sensing element 123 but may be independent of a communications package 132 including the passive identification mechanism 108 and/or the power transducer 121. In this manner, the communications package 132 may be operably coupled (e.g. via a Universal Serial Bus-type connection) to and provide power 122 to multiple sensors 102. Such a configuration may allow for connection of several limited-purpose sensors 102 configured for divergent sensing operations (e.g. a thermal sensor and a video capture sensor) into a single sensor package with a common communications package 132 configured for receiving power via a common sensor operation activation signal 120.

Figure 10:
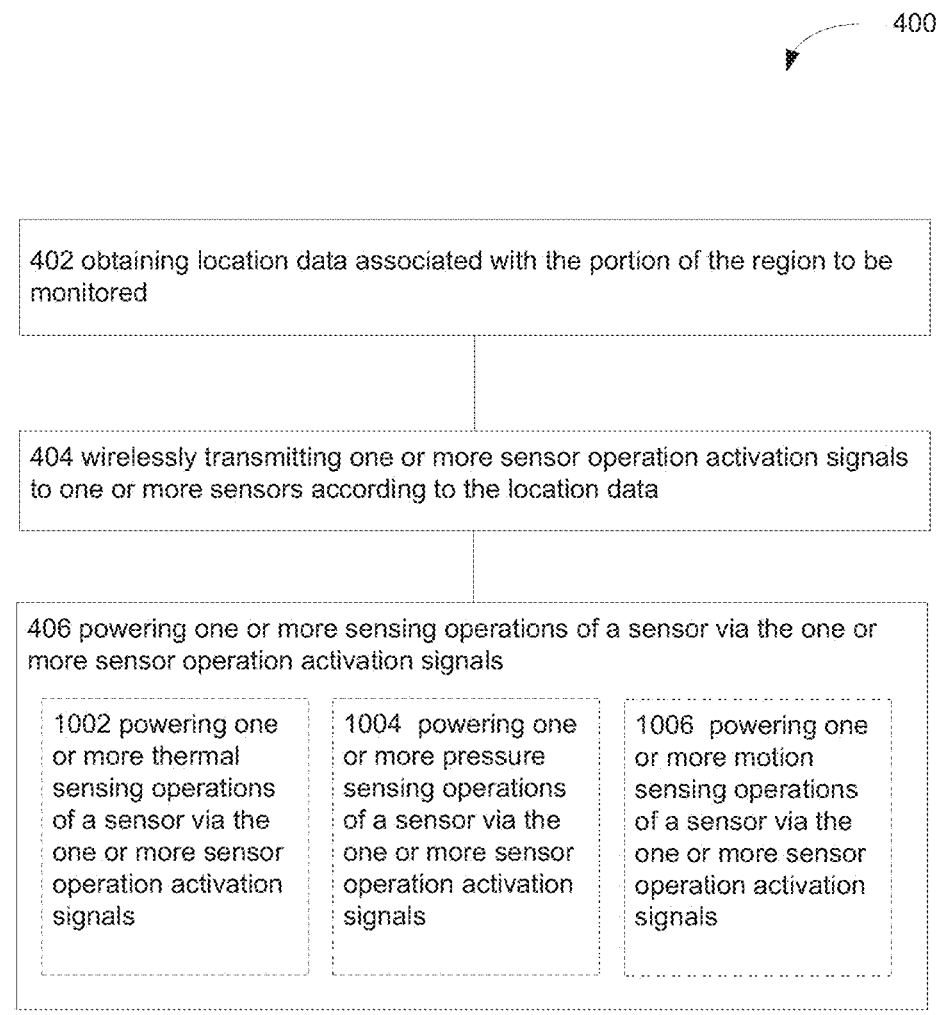

FIG. 10 further illustrates an operational procedure wherein operation 406 of operational flow 400 of FIG. 4 may include one or more additional operations. Additional operations may include operations 1002, 1004 and/or 1006.

Operation 1002 illustrates powering one or more thermal sensing operations of a sensor via the one or more sensor operation activation signals. For example, as shown in FIGS. 1-3, the sensors 102 may be configured as passive sensors with no independent power source for conducting thermal sensing operations by an thermal sensing element 123 (e.g. a thermo-resistor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired thermal sensing operations.

Operation 1004 illustrates powering one or more pressure sensing operations of a sensor via the one or more sensor operation activation signals. For example, as shown in FIGS. 1-3, the sensors 102 may be configured as passive sensors with no independent power source for conducting pressure sensing operations by an pressure sensing element 123 (e.g. a piezoelectric pressure sensor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired pressure sensing operations.

Operation 1006 illustrates powering one or more motion sensing operations of a sensor via the one or more sensor operation activation signals. For example, as shown in FIGS. 1-3, the sensors 102 may be configured as passive sensors with no independent power source for conducting motion sensing operations by a motion sensing element 123 (e.g. a camera, thermal sensor, pressure sensor, radar sensor, and the like). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired motion sensing operations.

Figure 11:
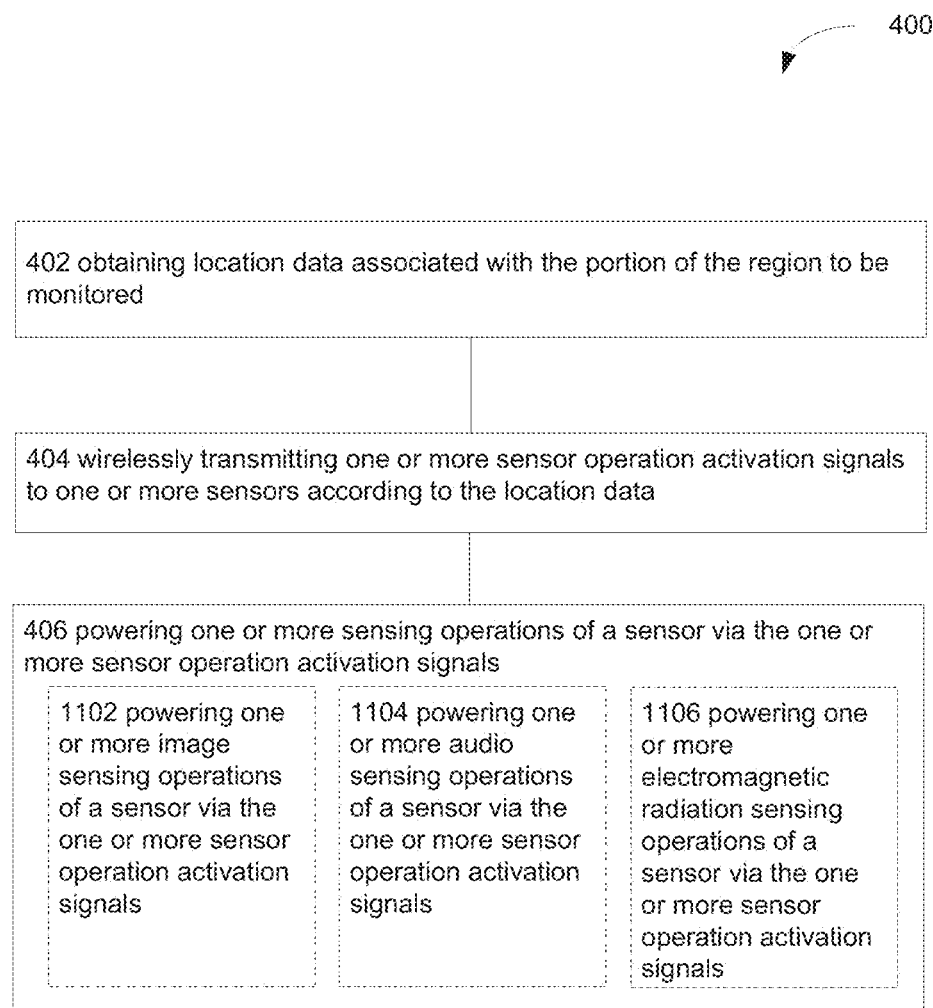

FIG. 11 illustrates an operational procedure wherein operation 406 of operational flow 400 of FIG. 4 may include one or more additional operations. Additional operations may include operations 1102, 1104 and/or 1106.

Operation 1102 illustrates powering one or more image sensing operations of a sensor via the one or more sensor operation activation signals. For example, as shown in FIGS. 1-3, the sensors 102 may be configured as passive sensors with no on-board power source for conducting image sensing operations by an image capture sensing element 123 (e.g. a still or video camera). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired image sensing operations.

Operation 1104 illustrates powering one or more audio sensing operations of a sensor via the one or more sensor operation activation signals. For example, as shown in FIGS. 1-3, the sensors 102 may be configured as passive sensors with no on-board power source for conducting audio sensing operations by an audio sensing element 123 (e.g. a microphone). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired audio sensing operations.

Operation 1106 illustrates powering one or more electromagnetic radiation sensing operations of a sensor via the one or more sensor operation activation signals. For example, as shown in FIGS. 1-3, the sensors 102 may be configured as passive sensors with no on-board power source for conducting electromagnetic radiation (EMR) sensing operations by an EMR sensing element 123. As such, the sensor monitoring device 103 may include a sensor operation activation transmitter 119 having a relatively higher power configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired EMR sensing operations.

Figure 12:
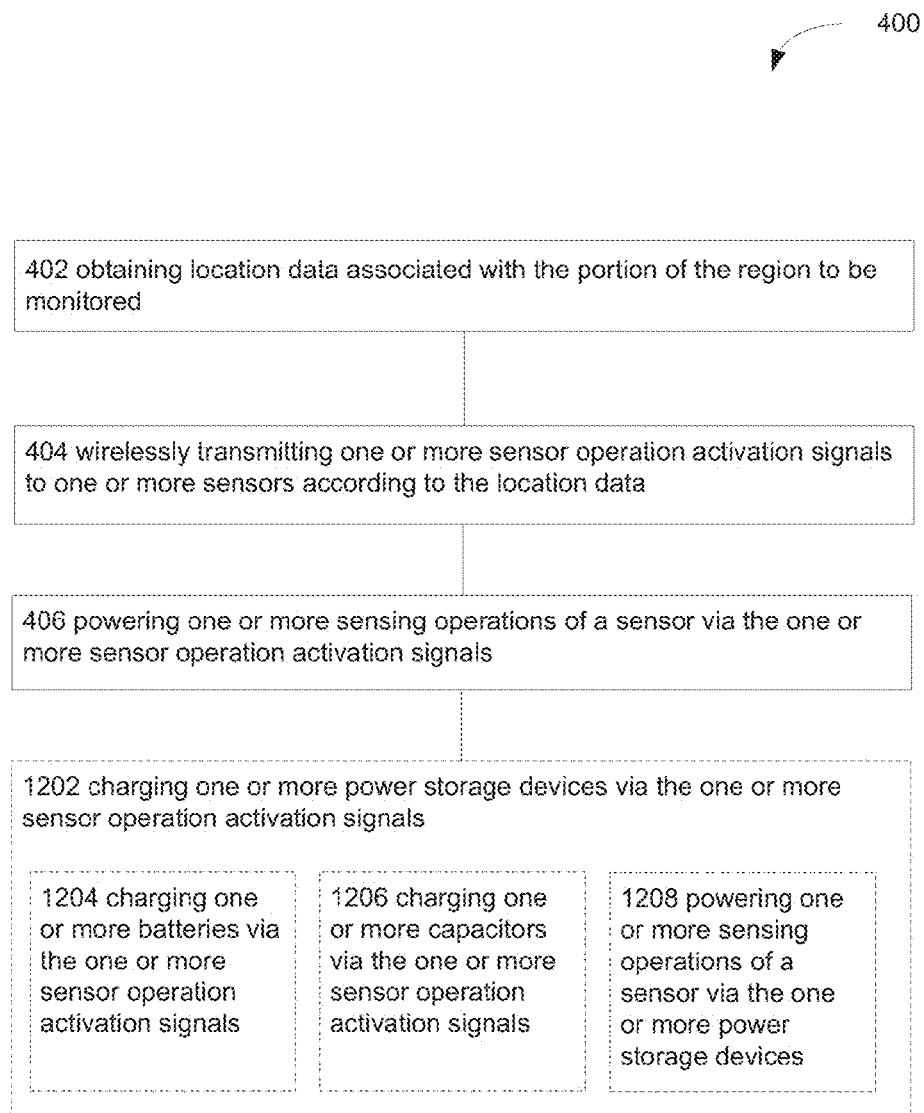

FIG. 12 illustrates an operational procedure wherein operational flow 400 of FIG. 4 may include one or more additional operations. Additional operations may include operation 1202.

Operation 1202 illustrates charging one or more power storage devices via the one or more sensor operation activation signals. For example, as shown in FIGS. 1-3, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include a power storage device 127 (e.g. a capacitor, a battery, and the like) chargeable by the power 122 generated by the power transducer 121 in response to the sensor operation activation signal 120.

FIG. 12 further illustrates an operational procedure wherein operation 1202 of operational flow 400 of FIG. 12 may include one or more additional operations. Additional operations may include operations 1204, 1206 and/or 1208.

Operation 1204 illustrates charging one or more batteries via the one or more sensor operation activation signals. For example, as shown in FIGS. 1-3, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more batteries chargeable by the power 122 generated by the power transducer 121 in response to the sensor operation activation signal 120.

Operation 1206 illustrates charging one or more capacitors via the one or more sensor operation activation signals. For example, as shown in FIGS. 1-3, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more capacitors chargeable by the power 122 generated by the power transducer 121 in response to the sensor operation activation signal 120.

Operation 1208 illustrates powering one or more sensing operations of a sensor via the one or more power storage devices. The power stored by the power storage device 127 may then be used for sensing operations of the sensing element 123 during time periods where the sensor operation activation transmitter 119 is not currently irradiating the power transducer 121.

Figure 13:
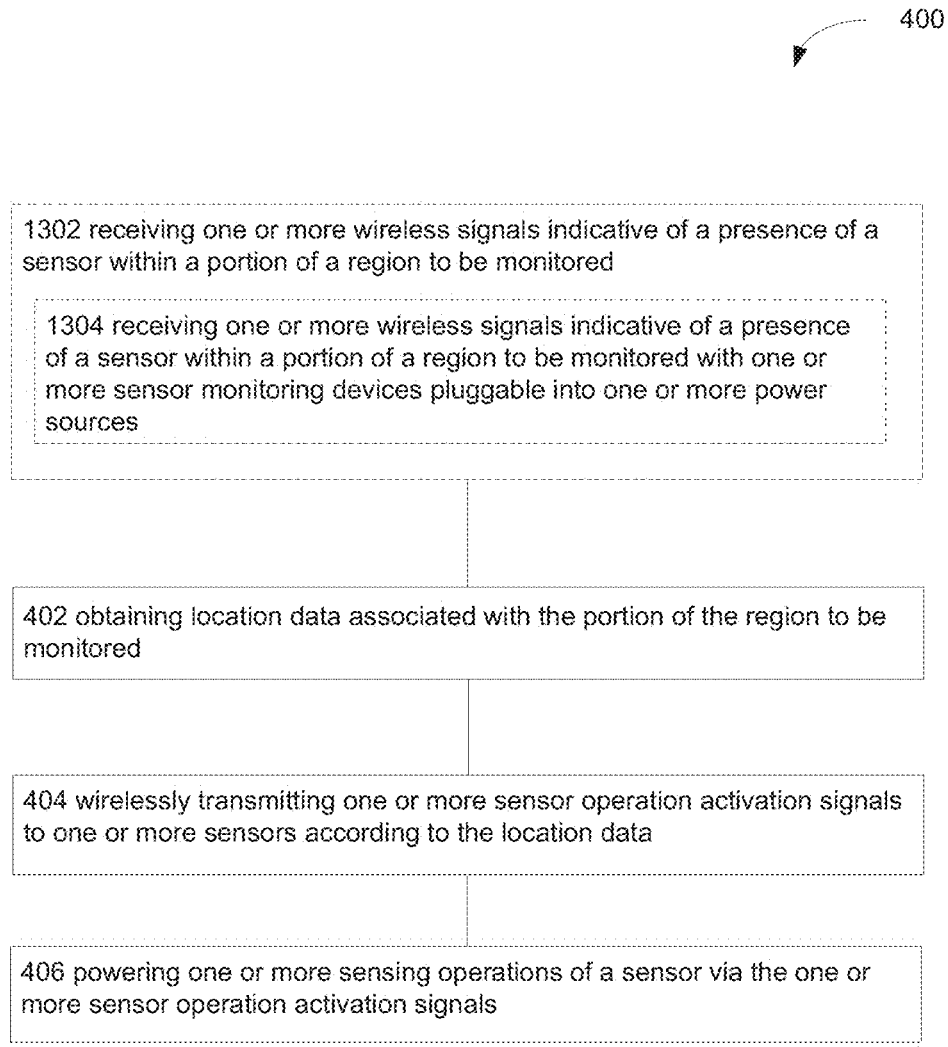

FIG. 13 illustrates an operational procedure wherein operational flow 400 of FIG. 4 may include one or more additional operations. Additional operations may include operation 1302.

Operation 1302 illustrates receiving one or more wireless signals indicative of a presence of a sensor within a portion of a region to be monitored. For example, as shown in FIGS. 1-3, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensors 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may, in turn, wirelessly transmit an identification signal 111 indicative of the presence of the sensor 102 within the region 101 which may be received by the sensor acquisition transceiver 110 of the sensor monitoring device 103.

The received identification signal 111 may simply be a beacon-type signal that simply indicates the presence of a sensor 102 within the currently scanned region (e.g. where the passive identification mechanism 108 is merely a reflective surface on the sensor 102). Alternately the received identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Figure 14:
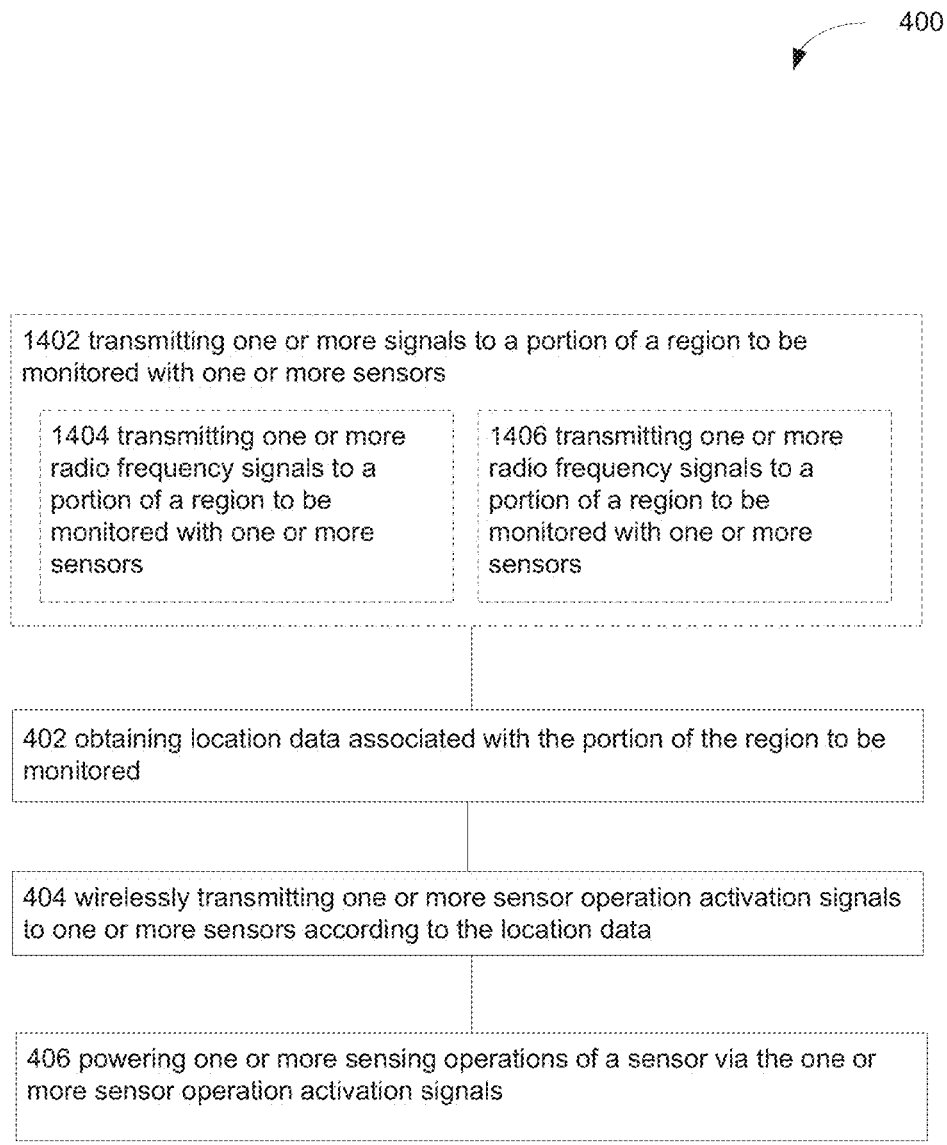

FIG. 13 further illustrates an operational procedure wherein operation 1302 of operational flow 400 of FIG. 14 may include one or more additional operations. Additional operations may include operation 1304.

Operation 1304 illustrates receiving one or more wireless signals indicative of a presence of a sensor within a portion of a region to be monitored with one or more sensor monitoring devices pluggable into one or more power sources. For example, as shown in FIG. 1, the sensor monitoring devices 103 may be configured as one or more standard environmental devices (e.g. a wall outlet-pluggable sensor monitoring device 103A, a light socket-pluggable sensor monitoring device 103B, and the like) such that the region 101 may be easily retrofitted to employ the ad hoc sensor system 100 by incorporating the sensor monitoring devices 103 into pre-existing power supplies.

FIG. 14 illustrates an operational procedure wherein operational flow 400 of FIG. 4 may include one or more additional operations. Additional operations may include operation 1402.

Operation 1402 illustrates transmitting one or more signals to a portion of a region to be monitored with one or more sensors. For example, as shown in FIGS. 1-3, the sensor monitoring device 103 may scan the region 101 in a zonal manner whereby the sensor acquisition transceiver 110 (e.g. a radio transceiver, a microwave transceiver, an infrared transceiver, an optical/laser transceiver, and the like) is progressively directed to various portions of the region 101 and transmits the sensor acquisition signal 109. The sensor monitoring devices 103 may cycle through a defined set of portions of the region 101 maintained by the sensor location database 117 and transmit the sensor operation activation signal 120 to a given portion of the region 101 during a given time interval associated with that portion of the region 101 before moving on to transmissions to additional portions of the region 101.

FIG. 14 further illustrates an operational procedure wherein operation 1402 of operational flow 400 of FIG. 14 may include one or more additional operations. Additional operations may include operations 1404 and/or 1406.

Operation 1404 illustrates transmitting one or more radio frequency signals to a portion of a region to be monitored with one or more sensors. For example, as shown in FIGS. 1-3, the sensor acquisition transceiver 110 may be progressively directed to various portions of the region 101 and transmits a sensor acquisition signal 109 characterized by having a frequency in the radio frequency range of from about 3 kHz to 3000 GHz.

Operation 1406 illustrates transmitting one or more optical frequency signals to a portion of a region to be monitored with one or more sensors. For example, as shown in FIGS. 1-3, the sensor acquisition transceiver 110 may be progressively directed to various portions of the region 101 and transmits a sensor acquisition signal 109 characterized by having a frequency in the optical/visible frequency range of from about 400-790 THz. Use of a sensor acquisition signal 109 in the optical/visible frequency range may have the advantage that such use is largely unregulated by governmental entities.

Figure 15:
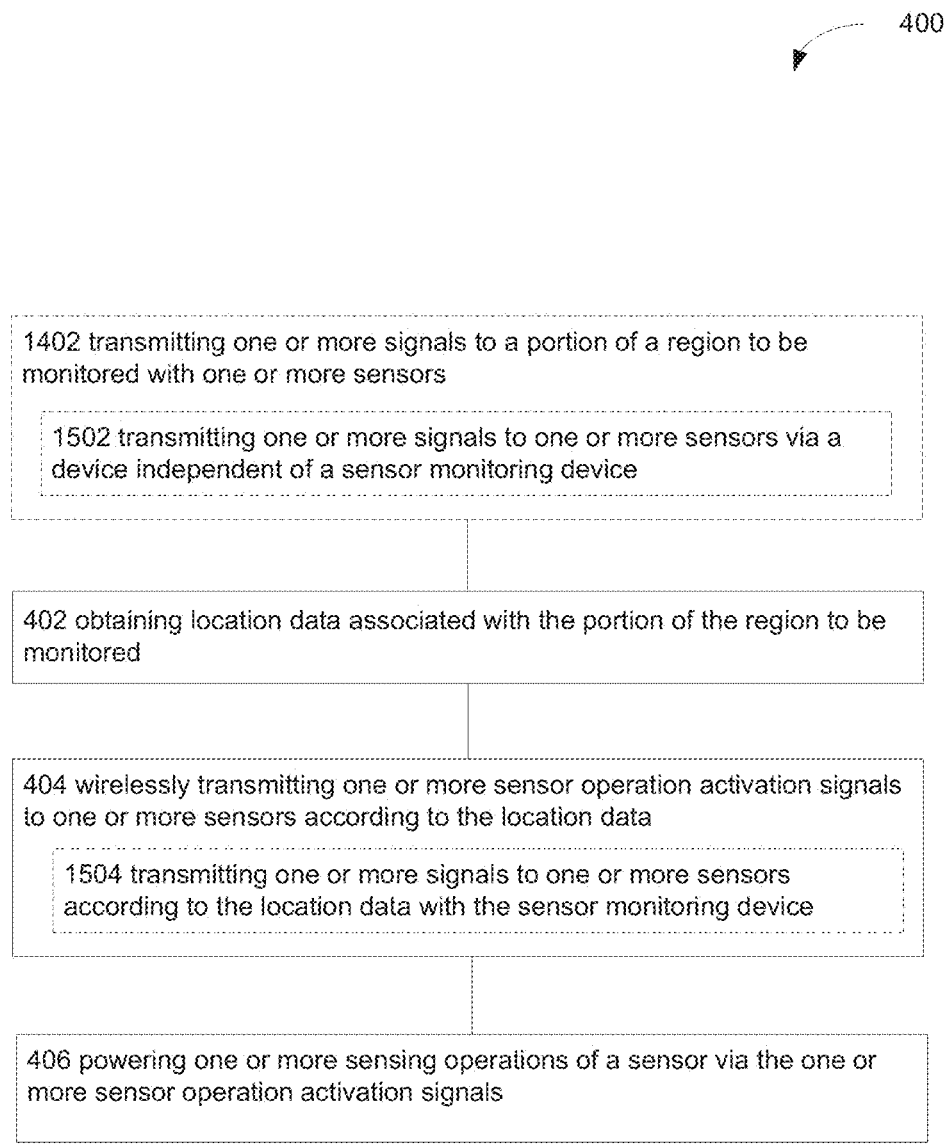

FIG. 15 illustrates an operational procedure wherein operations 1402 and 404 of operational flow 400 of FIG. 14 may include one or more additional operations. Additional operations may include operations 1502 and 1504, respectively.

Operation 1502 illustrates transmitting one or more signals to one or more sensors via a device independent of a sensor monitoring device. For example, as shown in FIGS. 1-3, the passive identification mechanism 108 may provide the identification signal 111 independent of any interaction with the sensor monitoring device 103. For example, the sensor 102 may include a transducer 112 responsive to an independent signal source 113 (e.g. a flashlight, handheld UV light, and the like). The transducer 112 may convert a signal (e.g. light) from the independent signal source 113 into power sufficient to power the passive identification mechanism 108 to temporarily generate the identification signal 111 for transmission to the sensor monitoring device 103. As such, a user tasked with affixing one or more sensors 102 about the region 101 may, at the same time, temporarily activate the passive identification mechanism 108 via the independent signal source 113 to allow for initial acquisition of the sensor 102 by the sensor monitoring device 103. It may be the case that the sensor monitoring device 103 is continually monitoring the region 101 and may detect the presence of the sensor 102 within the temporary activation of the passive identification mechanism 108 via the independent signal source 113.

Operation 1504 illustrates transmitting one or more signals to one or more sensors according to the location data with the sensor monitoring device. For example, as shown in FIGS. 1-3, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

Figure 16:
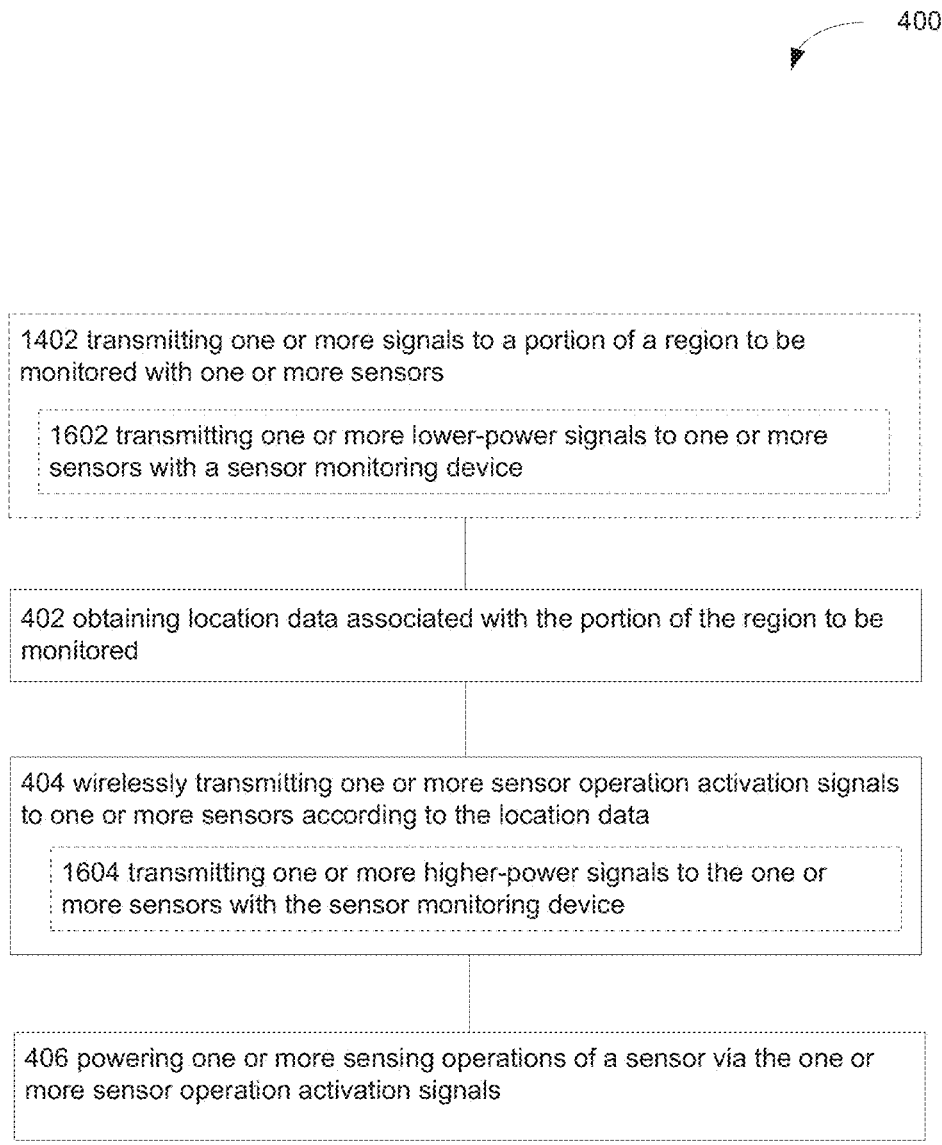

FIG. 16 illustrates an operational procedure wherein operations 1402 and 404 of operational flow 400 of FIG. 14 may include one or more additional operations. Additional operations may include operations 1602 and 1604, respectively.

Operation 1602 illustrates transmitting one or more lower-power signals to one or more sensors with a sensor monitoring device. For example, as shown in FIGS. 1-3, the sensor monitoring device 103 may scan the region 101 in a zonal manner whereby a lower-power sensor acquisition transceiver 110 (e.g. a radio transceiver, a microwave transceiver, an infrared transceiver, an optical/laser transceiver, and the like) is progressively directed to various portions of the region 101 and transmits the sensor acquisition signal 109. The sensor monitoring devices 103 may cycle through a defined set of portions of the region 101 maintained by the sensor location database 117 and transmit the sensor operation activation signal 120 to a given portion of the region 101 during a given time interval associated with that portion of the region 101 before moving on to transmissions to additional portions of the region 101.

Operation 1604 illustrates transmitting one or more higher-power signals to the one or more sensors with the sensor monitoring device. For example, as shown in FIGS. 1-3, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

FIG. 17 illustrates an operational procedure wherein operational flow 400 of FIG. 4 may include one or more additional operations. Additional operations may include operation 1702.

Operation 1702 illustrates transmitting one or more signals indicative of a presence of a sensor within the portion of the region to be monitored to a sensor monitoring device. For example, as shown in FIGS. 1-3, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

FIG. 17 further illustrates an operational procedure wherein operation 1702 of operational flow 400 of FIG. 17 may include one or more additional operations. Additional operations may include operations 1704, 1706 and/or 1708.

Operation 1704 illustrates transmitting one or more signals indicative of a presence of a sensor via a passive radio frequency identification chip of the sensor. For example, as shown in FIGS. 1-3, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Operation 1706 illustrates transmitting one or more signals indicative of a presence of a sensor via a retro-reflector of the sensor. For example, as shown in FIGS. 1-3, the identification signal 111 may simply be a beacon-type signal that indicates the presence of a sensor 102 within the currently scanned region. Specifically, it may be the case that the passive identification mechanism 108 is merely a reflective surface on a retro-reflector that merely reflects the sensor acquisition signal 109 back to the sensor acquisition transceiver 110 as the identification signal 111.

Operation 1708 illustrates transmitting one or more signals indicative of a presence of a sensor via a micro-electromechanical device of the sensor. For example, as shown in FIGS. 1-3, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

Figure 18:
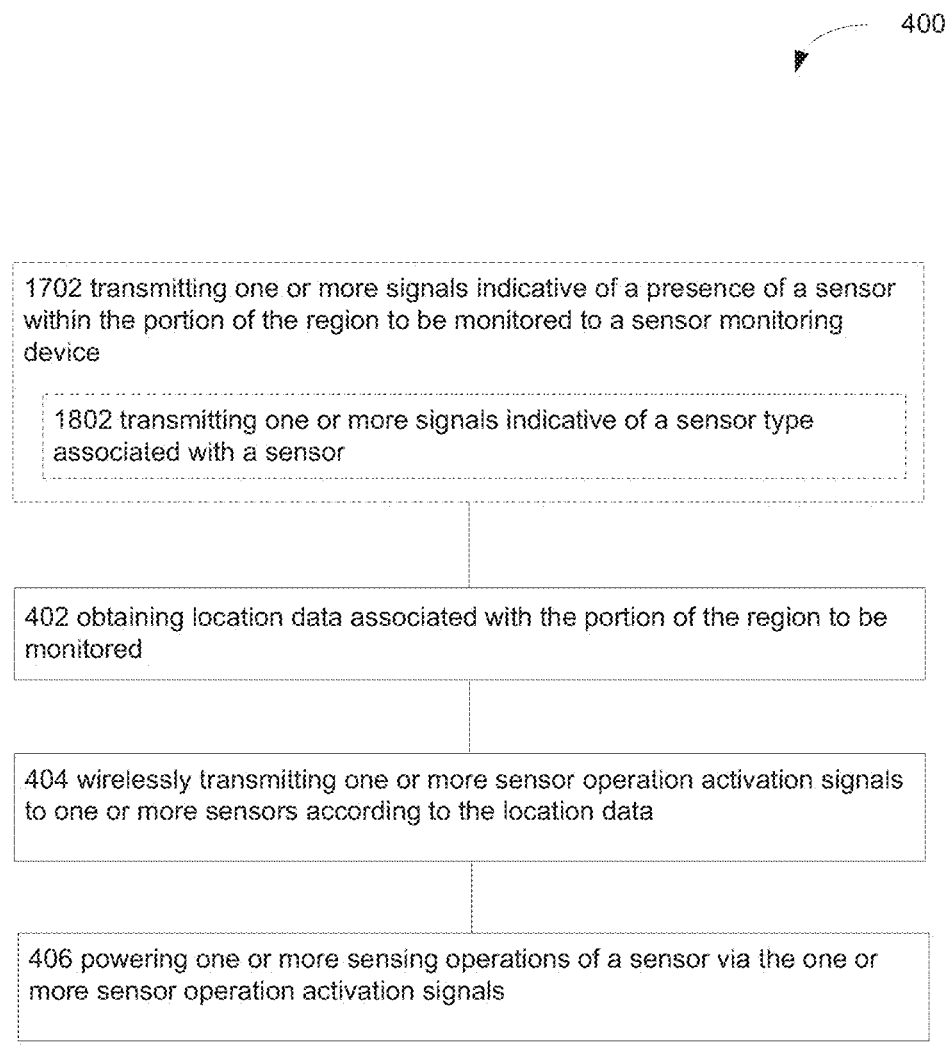

FIG. 18 illustrates an operational procedure wherein operation 1702 of operational flow 400 of FIG. 17 may include one or more additional operations. Additional operations may include operation 1802.

Operation 1802 illustrates transmitting one or more signals indicative of a sensor type associated with a sensor. For example, as shown in FIGS. 1-3, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Figure 19:
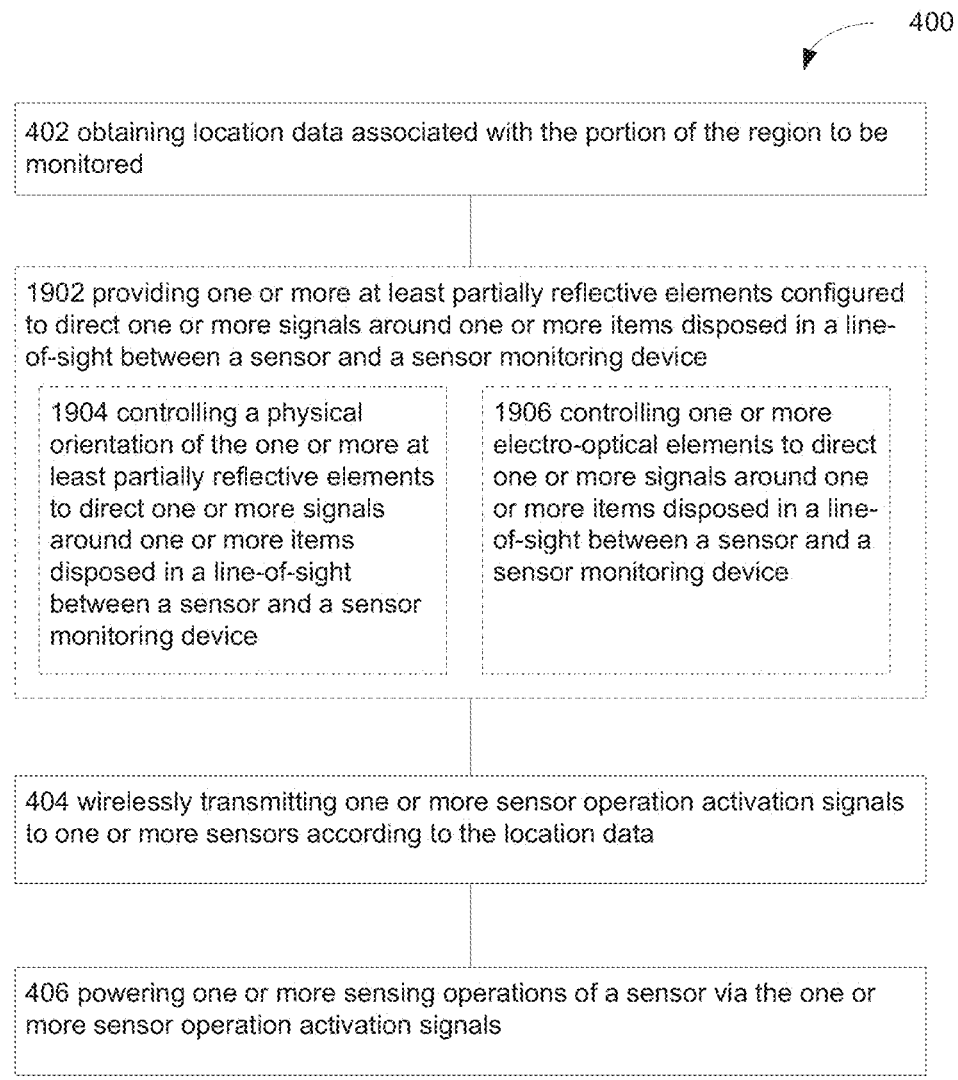

FIG. 19 illustrates an operational procedure wherein operational flow 400 of FIG. 4 may include one or more additional operations. Additional operations may include operation 1902.

Operation 1902 illustrates providing one or more at least partially reflective elements configured to direct one or more signals around one or more items disposed in a line-of-sight between a sensor and a sensor monitoring device. For example, as shown in FIGS. 1-3, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

FIG. 19 further illustrates an operational procedure wherein operation 1902 of operational flow 400 of FIG. 19 may include one or more additional operations. Additional operations may include operations 1904 and/or 1906.

Operation 1904 illustrates controlling a physical orientation of the one or more at least partially reflective elements to direct one or more signals around one or more items disposed in a line-of-sight between a sensor and a sensor monitoring device. For example, as shown in FIGS. 1-3, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be controllable structures (e.g. MEMS structures) which may include adjustable reflective surface 118 which may be physically oriented to redirect signals between the a sensor monitoring device 103 and a sensor 102.

Operation 1906 illustrates controlling one or more electro-optical elements to direct one or more signals around one or more items disposed in a line-of-sight between a sensor and a sensor monitoring device. For example, as shown in FIGS. 1-3, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be electrically controllable structures (e.g. a variable electro-optical mirror) which may include adjustable reflective surface 118 which may be physically oriented to redirect signals between the a sensor monitoring device 103 and a sensor 102.

Figure 20:
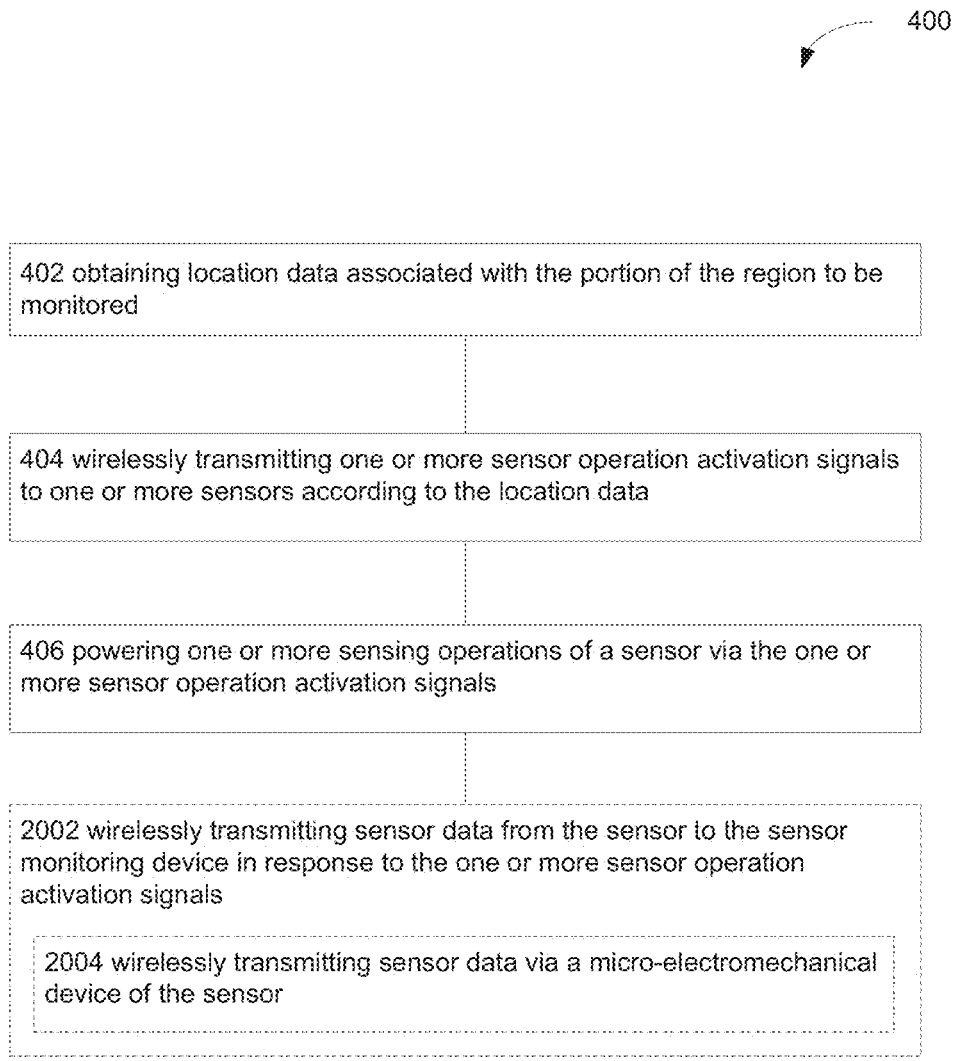

FIG. 20 illustrates an operational procedure wherein operational flow 400 of FIG. 4 may include one or more additional operations. Additional operations may include operation 2002.

Operation 2002 illustrates wirelessly transmitting sensor data from the sensor to the sensor monitoring device in response to the one or more sensor operation activation signals. For example, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

FIG. 20 further illustrates an operational procedure wherein operation 1402 of operational flow 400 of FIG. 20 may include one or more additional operations. Additional operations may include operation 2004.

Operation 2004 illustrates wirelessly transmitting sensor data via a micro-electromechanical device of the sensor. For example, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be an optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for communicating with one or more sensors, located within a region to be monitored, in an ad-hoc sensor network comprising:
    transmitting, by one or more sensor monitoring devices located in the region, to a portion of the region to be monitored with the one or more sensors, one or more wireless sensor acquisition signals;
    receiving, by the one or more sensor monitoring devices and from at least one sensor, one or more wireless signals transmitted responsive to the one or more wireless sensor acquisition signals, the one or more wireless signals indicative of the presence of the at least one sensor within the portion of the region to be monitored, the one or more wireless signals including identification data associated with the at least one sensor;
    determining, by the one or more sensor monitoring devices, a location of the at least one sensor based at least partly on the identification data of the one or more wireless signals received from the at least one sensor, the location indicative of the presence of the at least one sensor within the portion of the region to be monitored;
    determining, by the one or more sensor monitoring devices, whether at least one non-sensor object is present in a line-of-sight path between the at least one sensor and the one or more sensor monitoring devices, the determining based at least partly on the determined location of the at least one sensor and based at least partly on at least one safety signal detected by one or more safety sensors located within the portion of the region to be monitored; and
    directionally transmitting, by the one or more sensor monitoring devices and subsequent to the transmitting the one or more wireless sensor acquisition signals, one or more wireless sensor operation activation signals to the at least one sensor according to the location of the at least one sensor and the determination whether the at least one non-sensor object is present within the portion of the region to be monitored, the one or more wireless sensor operation activation signals configured for powering the at least one sensor for carrying out one or more sensing operations of the at least one sensor and configured for powering transmission of sensing data from the at least one sensor to the one or more sensor monitoring devices.

2. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering one or more sensing operations of the at least one sensor comprises:
    directionally transmitting the one or more wireless sensor operation activation signals to the at least one sensor according to a programmed schedule.

3. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering one or more sensing operations of the at least one sensor comprises:
    directionally transmitting the one or more wireless sensor operation activation signals to the at least one sensor according to one or more external control signals provided to the one or more sensor monitoring devices.

4. The method of claim 3, wherein the directionally transmitting the one or more wireless sensor operation activation signals to the at least one sensor according to the one or more external control signals comprises:

directionally transmitting the one or more wireless sensor operation activation signals to the at least one sensor according to the one or more external control signals received from at least one external device.

5. The method of claim 3, wherein the directionally transmitting the one or more wireless sensor operation activation signals to the at least one sensor according to the one or more external control signals comprises:

directionally transmitting the one or more wireless sensor operation activation signals to the at least one sensor according to the one or more external control signals received from one or more switches.

6. The method of claim 1, wherein the one or more sensor monitoring devices comprises:

the one or more sensor monitoring devices operatively coupled with one or more processing devices, the one or more processing devices including at least one of a cell phone, a tablet computer, a laptop computer, or a desktop computer.

7. The method of claim 1, wherein the directionally transmitting the one or more wireless sensor operation activation signals to the at least one sensor according to the determined location of the at least one sensor and the determination whether the at least one non-sensor object is present within the portion of the region to be monitored, the one or more wireless sensor operation activation signals configured for powering the one or more sensing operations of the at least one sensor comprises:

directionally transmitting the one or more wireless sensor operation activation signals to the at least one sensor in a substantially continuous manner during sensor operation.

8. The method of claim 1, wherein the directionally transmitting the one or more wireless sensor operation activation signals to the at least one sensor according to the determined location of the at least one sensor and the determination whether the at least one non-sensor object is present within the portion of the region to be monitored, the one or more wireless sensor operation activation signals configured for powering the one or more sensing operations of the at least one sensor comprises:

directionally transmitting the one or more wireless sensor operation activation signals to the at least one sensor in an at least partially intermittent manner during sensor operation.

9. The method of claim 1, wherein the powering the one or more sensing operations of the at least one sensor comprises:

powering two or more sensors with a common sensor operation activation signal.

10. The method of claim 9, wherein the powering the two or more sensors with the common sensor operation activation signal comprises:

powering the two or more sensors configured for divergent sensing operations with the common sensor operation activation signal.

11. The method of claim 1, wherein the powering the one or more sensing operations of the at least one sensor comprises:

powering at least one of one or more thermal sensing operations, one or more pressure sensing operations, one or more motion sensing operations, or one or more image sensing operations of the at least one sensor.

12. The method of claim 1, wherein the powering the one or more sensing operations of the at least one sensor comprises:

powering audio sensing operations of the at least one sensor.

13. The method of claim 1, wherein the powering the one or more sensing operations of the at least one sensor comprises:

powering one or more electromagnetic radiation sensing operations of the at least one sensor.

14. The method of claim 1, further comprising:

charging one or more power storage devices of the at least one sensor via the one or more sensor operation activation signals.

15. The method of claim 1, wherein the receiving the one or more wireless signals indicative of the presence of the at least one sensor within the portion of the region to be monitored comprises:

receiving the one or more wireless signals indicative of the presence of the at least one sensor within the portion of the region to be monitored with the one or more sensor monitoring devices pluggable into one or more power sources.

16. The method of claim 1, wherein the transmitting, to the portion of the region to be monitored with the one or more sensors, the one or more wireless sensor acquisition signals comprises:

transmitting one or more radio frequency signals to the portion of the region to be monitored with the one or more sensors, and wherein the receiving, from the at least one sensor, the one or more wireless signals transmitted responsive to the one or more wireless sensor acquisition signals, the one or more wireless signals indicative of the presence of the at least one sensor within the portion of the region to be monitored includes at least:

receiving the one or more wireless signals transmitted responsive to the one or more radio frequency signals transmitted to the portion of the region to be monitored, and wherein the determining the location of the at least one sensor based at least partly on the one or more wireless signals received from the at least one sensor, the location indicative of the presence of the at least one sensor within the portion of the region to be monitored includes at least:

determining the location of the at least one sensor based at least partly on the one or more wireless signals received from the at least one sensor in response to the transmitted one or more radio frequency signals.

17. The method of claim 1, wherein the transmitting, to the portion of the region to be monitored with one or more sensors, one or more wireless sensor acquisition signals comprises:

transmitting one or more optical frequency signals to the portion of the region to be monitored with the one or more sensors and wherein the receiving, from the at least one sensor, the one or more wireless signals transmitted responsive to the one or more wireless sensor acquisition signals, the one or more wireless signals indicative of the presence of the at least one sensor within the portion of the region to be monitored includes at least:

receiving the one or more wireless signals transmitted responsive to the one or more optical frequency signals transmitted to the portion of the region to be monitored, and wherein the determining the location of the at least one sensor based at least partly on the one or more wireless signals received from the at least one sensor, the location indicative of the presence of the at least one sensor within the portion of the region to be monitored includes at least:
determining the location of the at least one sensor based at least partly on the one or more wireless signals received from the at least one sensor in response to the transmitted one or more optical frequency signals.

18. The method of claim 1, wherein the determining the location of the at least one sensor based at least partly on the one or more wireless signals received from the at least one sensor, the location indicative of the presence of the at least one sensor within the portion of the region to be monitored comprises:
transmitting one or more signals to the one or more sensors via a device independent of the one or more sensor monitoring devices; and
wherein the directionally transmitting the one or more wireless sensor operation activation signals to the at least one sensor includes at least:
directionally transmitting the one or more wireless signals to the one or more sensors according to the location data.

19. The method of claim 1, wherein the determining the location of the at least one sensor based at least partly on the one or more wireless signals received from the at least one sensor, the location indicative of the presence of the at least one sensor within the portion of the region to be monitored comprises:
transmitting one or more lower-power signals to the one or more sensors with I the one or more sensor monitoring devices; and
wherein the directionally transmitting the one or more wireless sensor operation activation signals to the al least one sensor includes at least:
directionally transmitting one or more higher-power signals to the one or more sensors.

20. The method of claim 1, wherein the determining the location of the at least one sensor based at least partly on the one or more wireless signals received from the at least one sensor, the location indicative of the presence of the at least one sensor within the portion of the region to be monitored comprises:
receiving one or more signals indicative of at least one attribute of the at least one sensor.

21. The method of claim 14, further comprising:
powering the one or more sensing operations of the at least one sensor via the one or more power storage devices.

22. The method of claim 1, wherein the determining the location of the at least one sensor based at least partly on the one or more wireless signals received from the at least one sensor, the location indicative of the presence of the at least one sensor within the portion of the region to be monitored comprises:
determining an orientation of a directional receiver of the one or more sensor monitoring devices receiving one or more signals from the at least one sensor.

23. The method of claim 1, wherein the one or more wireless sensor activation signals configured for powering the one or more sensing operations of the at least one sensor comprises:
the one or more wireless sensor activation signals configured to be converted to at least one of electrical or optical signals via at least one transducer of the at least one sensor to power one or more sensing operations of the at least one sensor.

24. The method of claim 1, wherein the directionally transmitting the one or more wireless sensor operation activation signals to the at least one sensor according to the location of the at least one sensor, the one or more wireless sensor operation activation signals configured for powering the one or more sensing operations of the at least one sensor comprises:
controlling at least one of actuators or a directional antennal array to directionally orient transmission of the wireless sensor operation activation signals toward a location of the one or more sensors.

25. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering the one or more sensing operations of the at least one sensor comprises:
determining a direction for transmission of the one or more wireless sensor operation activation signals based at least partly on the determination whether the line-of-sight path exists.

26. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering the one or more sensing operations of the at least one sensor comprises:
determining whether at least one secondary transmission device is at least one of logically or physically disposed between the at least one sensor and the at least one sensor monitoring device; and
directionally transmitting the one or more wireless sensor operation activation signals to the at least one sensor via the at least one secondary transmission device based at least partly on the determination whether the at least one secondary transmission device is disposed between the at least one sensor at the at least one sensor monitoring device.

27. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering the one or more sensing operations of the at least one sensor comprises:
determining whether at least one alternative transmission route exists between the at least one sensor and the at least one sensor monitoring device; and
directionally transmitting the one or more wireless sensor operation activation signals to the at least one sensor based at least partly on the determination whether the at least one alternative transmission route exists between the at least one sensor at the at least one sensor monitoring device.

28. The method of claim 1, wherein the directionally transmitting the one or more wireless sensor operation activation signals to the at least one sensor according to the location of the at least one sensor and the determination whether the at least one non-sensor object is present within the portion of the region to be monitored, the one or more wireless sensor operation activation signals configured for powering the one or more sensing operations of the at least one sensor comprises:
  transmitting the one or more wireless operation activation signals only if the line-of-sight path exists between the at least one sensor and the at least one sensor monitoring device.

29. The method of claim 1, further comprising:
  determining whether to alter a signal power level of the one or more wireless sensor operation activation signals based at least partly on the determination whether the at least one non-sensor object is present within the portion of the region to be monitored.

30. A system for communicating with one or more sensors, located within a region to be monitored, in an ad-hoc sensor network comprising:
  a non-transitory computer readable medium bearing one or more instructions that, when executed, cause the system to:
  transmit, by one or more sensor monitoring devices located in the region, to a portion of the region to be monitored with the one or more sensors, one or more wireless sensor acquisition signals;
  receive, by the one or more sensor monitoring devices and from at least one sensor, one or more wireless signals transmitted responsive to the one or more wireless sensor acquisition signals, the one or more wireless signals indicative of the presence of the at least one sensor within the portion of the region to be monitored, the one or more wireless signals including identification data associated with the at least one sensor;
  determine, by the one or more sensor monitoring devices, a location of the at least one sensor based at least partly on the identification data of the one or more wireless signals received from the at least one sensor, the location indicative of the presence of the at least one sensor within the portion of the region to be monitored;
  determine, by the one or more sensor monitoring devices, whether at least one non-sensor object is present in a line-of-sight path between the at least one sensor and the one or more sensor monitoring devices, the determining based at least partly on the determined location of the at least one sensor and based at least partly on at least one safety signal detected by one or more safety sensors located within the portion of the region to be monitored; and
  directionally transmit, by the one or more sensor monitoring devices and subsequent to the transmitting the one or more wireless sensor acquisition signals, one or more wireless sensor operation activation signals to the at least one sensor according to the location of the at least one sensor and the determination whether the at least one non-sensor object is present within the portion of the region to be monitored, the one or more wireless sensor operation activation signals configured for powering the at least one sensor for carrying out one or more sensing operations of the at least one sensor and configured for powering transmission of sensing data from the at least one sensor to the one or more sensor monitoring devices.

31. A system for communicating with one or more sensors, located within a region to be monitored, in an ad-hoc sensor network comprising:
  circuitry for transmitting, by one or more sensor monitoring devices located in the region, to a portion of the region to be monitored with the one or more sensors, one or more wireless sensor acquisition signals;
  circuitry for receiving, by the one or more sensor monitoring devices and from at least one sensor, one or more wireless signals transmitted responsive to the one or more wireless sensor acquisition signals, the one or more wireless signals indicative of the presence of the at least one sensor within the portion of the region to be monitored, the one or more wireless signals including identification data associated with the at least one sensor;
  circuitry for determining, by the one or more sensor monitoring devices, a location of the at least one sensor based at least partly on the identification data of the one or more wireless signals received from the at least one sensor, the location indicative of the presence of the at least one sensor within the portion of the region to be monitored;
  circuitry for determining, by the one or more sensor monitoring devices, whether at least one non-sensor object is present in a line-of-sight path between the at least one sensor and the one or more sensor monitoring devices, the determining based at least partly on the determined location of the at least one sensor and based at least partly on at least one safety signal detected by one or more safety sensors located within the portion of the region to be monitored; and
  circuitry for directionally transmitting, by the one or more sensor monitoring devices and subsequent to the transmitting the one or more wireless sensor acquisition signals, one or more wireless sensor operation activation signals to the at least one sensor according to the location of the at least one sensor and the determination whether the at least one non-sensor object is present within the portion of the region to be monitored, the one or more wireless sensor operation activation signals configured for powering the at least one sensor for carrying out one or more sensing operations of the at least one sensor and configured for powering transmission of sensing data from the at least one sensor to the one or more sensor monitoring devices.

32. A non-transitory computer-readable medium embodying computer-readable instructions for execution of a process on a computing device of one or more sensor monitoring devices to communicate with one or more sensors located within a region to be monitored, the process comprising:
  transmitting, by one or more sensor monitoring devices located in the region, to a portion of the region to be monitored with the one or more sensors, one or more wireless sensor acquisition signals;
  receiving, by the one or more sensor monitoring devices and from at least one sensor, one or more wireless signals transmitted responsive to the one or more wireless sensor acquisition signals, the one or more wireless signals indicative of the presence of the at least one sensor within the portion of the region to be monitored, the one or more wireless signals including identification data associated with the at least one sensor;
  determining, by the one or more sensor monitoring devices, a location of the at least one sensor based at least partly on the identification data of the one or more wireless signals received from the at least one sensor, the location indicative of the presence of the at least one sensor within the portion of the region to be monitored;

determining, by the one or more sensor monitoring devices, whether at least one non-sensor object is present in a line-of-sight path between the at least one sensor and the one or more sensor monitoring devices, the determining based at least partly on the determined location of the at least one sensor and based at least partly on at least one safety signal detected by one or more safety sensors located within the portion of the region to be monitored; and directionally transmitting, by the one or more sensor monitoring devices and subsequent to the transmitting the one or more wireless sensor acquisition signals, one or more wireless sensor operation activation signals to the at least one sensor according to the location of the at least one sensor and the determination whether the at least one non-sensor object is present within the portion of the region to be monitored, the one or more wireless sensor operation activation signals configured for powering the at least one sensor for carrying out one or more sensing operations of the at least one sensor and configured for powering transmission of sensing data from the at least one sensor to the one or more sensor monitoring devices.

* * * * *

UNITED STATES PATENT AND TRADEMARK OFFICE
CERTIFICATE OF CORRECTION

PATENT NO. : 9,900,668 B2  
APPLICATION NO. : 13/727109  
DATED : February 20, 2018  
INVENTOR(S) : Jesse R. Cheatham, III et al.

Page 1 of 1

It is certified that error appears in the above-identified patent and that said Letters Patent is hereby corrected as shown below:

In the Claims

At Column 27, Claim 19, Line 34, "or more sensors with I the one or more sensor monitoring" should read --or more sensors with the one or more sensor monitoring--

At Column 27, Claim 19, Line 37, "wireless sensor operation activation signals to the al" should read --wireless sensor operation activation signals to the at--

Signed and Sealed this  
Twenty-ninth Day of January, 2019

Andrei Iancu  
*Director of the United States Patent and Trademark Office*